United States Patent [19]

Ohno et al.

[11] Patent Number: 5,241,531
[45] Date of Patent: Aug. 31, 1993

[54] STORAGE MEDIUM HAVING READ/WRITE STORAGE REGION AND READ-ONLY STORAGE REGION AND A METHOD FOR MANAGING DEFECTIVE SECTORS IN THE STORAGE MEDIUM

[75] Inventors: Motoyasu Ohno, Tokyo; Keiji Ueki, Zama; Atsushi Shinno, Chigasaki, all of Japan

[73] Assignee: Matsushita Graphic Communication Systems, Inc., Tokyo, Japan

[21] Appl. No.: 789,211

[22] Filed: Nov. 7, 1991

[30] Foreign Application Priority Data

Nov. 7, 1990 [JP] Japan .................................. 2-303637
Nov. 7, 1990 [JP] Japan .................................. 2-303646

[51] Int. Cl.⁵ .......................................... G11B 13/04
[52] U.S. Cl. ............................ 369/275.2; 369/275.3; 369/59
[58] Field of Search ................ 360/49, 53, 54, 61; 369/53, 48, 32, 58, 59, 24, 54, 275.3, 275.2

[56] References Cited

U.S. PATENT DOCUMENTS

| | | | |
|---|---|---|---|
| 4,811,124 | 3/1989 | Dujari et al. | 360/49 |
| 4,833,663 | 5/1989 | Satoh et al. | 369/321 |
| 4,953,122 | 8/1990 | Williams | 369/53 |
| 5,075,804 | 12/1991 | Deyring | 369/48 |
| 5,111,444 | 5/1992 | Fukushima et al. | 369/58 |

*Primary Examiner*—Paul M. Dzierzynski
*Assistant Examiner*—Kim-Kwok Chu
*Attorney, Agent, or Firm*—Lowe, Price, LeBlanc & Becker

[57] ABSTRACT

A storage medium provided with a read/write storage region, another read-only storage region and a preliminary storage region for storing data to be stored in defective portions, which are defective in a storing function, of the read/write storage region and the read-only storage region. Thereby, defective portions can suitably be effected even when a read/write storage region and a read-only storage region coexist in a storage medium.

14 Claims, 26 Drawing Sheets

X : DEFECTIVE SECTORS

X : DEFECTIVE SECTORS

STORAGE MEDIUM HAVING READ/WRITE STORAGE REGION AND READ-ONLY STORAGE REGION AND A METHOD FOR MANAGING DEFECTIVE SECTORS IN THE STORAGE MEDIUM

BACKGROUND OF THE INVENTION

1. Field of The Invention

This invention relates to a storage medium having a readable and writable storage region (hereunder referred to as a read/write storage region) and another read-only storage region and also relates to a disk-like storage medium including a read-only storage region.

2. Description of The Related Art

In order to inexpensively provide known information or data for users, memory manufacturers develop and plan to market memories such as an optical disk of the type in which a read-only memory (ROM) region being not writable exists together with a read/write random access memory (RAM) region. Previously, an optical-disk manufacturer saves the latest information in optical disks before forwarding the optical disks by providing fundamental information (for example, information described on a map, information on layouts of stores or the like) as known information to be stored in one or more optical disks each composed of only a ROM region and writing update information for adding supplemental information to or modifying the fundamental information to one or more optical disks each composed of only a RAM region of which the stored data can be updated by users. In such a case, the information can easily be managed by containing the ROM region for storing the fundamental data and the RAM region for storing the update data in an optical disk. Moreover, efficiency in accessing and retrieving the information can be improved. Furthermore, efficiency in each user's work can be also increased.

By the way, a storage region in an optical disk is composed of a user area to be used by an user of a host system, a spare area (or preliminary area) to be used instead of a defective sector other than an initial defective sector which has already been defective at the time of forwarding the optical disk and a management area to be used for managing information to be stored in an alternate area. Further, there are the following conventional methods for managing defects in a storage medium: Sector slipping Defect Management method (hereunder abbreviated as SDM); and Linear replacement Defect Management method (hereunder abbreviated as LDM).

SDM is a method for removing a defective sector from an optical disk before a user uses the storage medium for the first time. In case of this method, logical addresses to be used for accessing the optical disk by the host system are assigned to track numbers of tracks and sector numbers of sectors physically managed in the optical disk other than defective sectors determined by Certification and spare sectors (i.e., preliminary sectors). Incidentally, Certification is an operation of detecting initial defective sectors and correcting defective areas by performing a deletion operation, a write operation and a verification operation on all storage areas of an optical disk.

LDM is a method for removing a defective sector from an optical disk when the defective sector occurs therein after SDM has been performed thereon.

Hereinafter, an example of a defect management operation effected by applying LDM to an optical disk will be described by FIGS. 12 and 13.

FIGS. 12 and 13 illustrate algorithms for managing a defect in what is called a full-RAM optical disk which is erasable and re-writable and is now under discussion in International Standardization Organization (ISO). FIG. 12 shows a state of a storage region of an optical disk on which SDM is performed.

In FIG. 12 each reference numeral (i.e., 0, 1, ... /r 177) corresponding to a combination of a physical track number (hereunder sometimes referred to as a physical track address) and a physical sector number (hereunder sometimes referred to as a physical sector address) indicates a logical number (hereunder sometimes referred to as a logical address) assigned to a location of a storage region. For instance, a logical address 25 is indicated at and assigned to a location corresponding to the combination of a physical track address 2 and a physical sector address 1. As is seen from this figure, no logical address is assigned to a a defective sector which is represented by St. Andrew's cross x (for example, a sector indicated by the combination of a physical track address 2 and a physical sector address 2), a logical address is assigned to the next sector (namely, a logical address 26 is assigned to a sector indicated by the combination of a physical track address 2 and a physical sector address 3 which is next to this defective sector in the example).

FIG. 13 illustrates a state of an optical disk on which LDM is performed. As is shown in FIG. 13 data to be written to a sector R1 corresponding to the combination of a physical track address 5 and a physical sector address 7, which becomes defective after SDM is performed, is stored in a sector corresponding to a physical track address (hereunder sometimes referred to simply as a track address) 8 and a physical sector address (hereunder sometimes referred to simply as a sector address) 0 of a spare area together with a logical address 65. This results in that when a sector having the logical address 65 is accessed by a host computer or system, the sector indicated by the combination of the track address 8 and the sector 0 is practically accessed. Further, when an alternate sector &/r a defective sector R2 indicated by the combination of the track address 7 and the sector address 7 is allotted to a sector of a spare area, a defective sector corresponding to a track address 8 and a sector address 1 is not used as the alternate sector and a logical address 89 is assigned to the next sector corresponding to the track address 8 and the sector address 2.

Although there have been conventional defect management methods regarding what is called a full RAM, there have been proposed no suitable defect management methods regarding an optical disk of the type in which a RAM region and a ROM region coexist. The present invention is accomplished to solve such a problem of the prior art.

It is, therefore, an object of the present invention to provide a defect management method for managing a defect in a storage medium of the type in which a RAM region and a ROM region coexist.

Further, referring to FIGS. 25 and 26, there is shown a structure of an optical disk in which a RAM region and a ROM region are provided. In FIG. 25, reference numeral 2 indicating an outer hatched ring-like area represents the ROM region; and reference numeral 1 indicating an inner ring-like area designates the RAM region. FIG. 26 is a diagram for illustrating the structure of a part of a storage region of this optical disk by representing each storage cell by means of a square. As shown in this figure, the RAM region is comprised of physical tracks 0 to 7, each of which has 12 physical sectors. Further, the ROM region is composed of physical tracks 8 to 16, each of which also has 12 physical sectors.

As is seen from FIG. 26, in case of the arrangement of the ROM and RAM regions as illustrated in this figure, 7hen update information for updating the fundamental information in the ROM region is stored in the RAM region, the update information can initially be stored in physical sectors of the RAM region which are near to the ROM region. If the read-only storage region includes a code region, logical addresses are not assigned to sectors of the code region. Incidentally, in the instant application, the term "update information is defined as new information to which fundamental information stored in the ROM area is updated or changed. However, in case where a quantity of update information to be written to the RAM region is large, a part of the update information should be stored in physical sectors of the RAM region, which are far away from the ROM region. This results in that it takes time to write the update information to the RAM region and to read the update information from the RAM region.

The present invention is also created to solve such a problem of the prior art.

It is, accordingly, another object of the present invention to provide a storage medium having a RAM and ROM regions, wherein update information for updating the fundamental information stored in the ROM region is stored in a part of the RAM region, which is as near as possible to the ROM region.

SUMMARY OF THE INVENTION

To achieve the foregoing object, in accordance with an aspect of the present invention, there is provided a storage medium which comprises a read/write storage region, another read-only storage region and a preliminary storage region for storing data to be stored in defective portions of the read/write storage region and the read-only storage region. Incidentally, the defective portions are portions of each storage region, which are defective in a storing function. In case of the read/write storage region, initial defective sectors are detected by performing Certification of SDM before first used by a user. Thereafter, logical addresses are assigned to sectors of the read/write storage region by slipping the detected defective sectors. Further, regarding defective sectors occurring after that processing, logical addresses assigned to these defective sectors are re-assigned to sectors of the preliminary area by using LDM and data to be stored in these defective sectors are written to the corresponding sectors of the preliminary area. In contrast, in case of the read-only storage region, initial defective sectors cannot be detected by Certification (namely, SDM cannot be used). However, information representing an error correction code is written to sectors of the read-only storage region, and the code area (storing parity codes) is included in other sectors thereof. Thus it can be detected which one of sectors of the read-only storage region includes a defect or error. Consequently, in case of the read-only storage region, logical addresses are assigned to all of sectors thereof without slipping defective sectors. Then, the defective sectors are excluded by using LDM. Moreover, the logical addresses assigned to the defective sectors are re-assigned to sectors of the preliminary area and data to be stored in the defective sectors are written to the corresponding sectors of the preliminary area. Additionally, defective sectors occurring after such processing are excluded by using LDM, and logical addresses assigned to these defective sectors are re-assigned to sectors of the preliminary area and data to be stored in these defective sectors are written to the corresponding sectors of the preliminary area, similarly as in case of the read/write storage region.

As hereinabove summarized, if a code area is included in the read-only storage region, logical addresses are made not to be assigned to sectors of the code area. Namely, when initial defective sectors of the code area are detected and Certification processing is effected, sectors of the code area are slipped and thus logical addresses are not assigned to the sectors of the code area. Thereby, when quality of produced optical disks becomes stable and there are no defects or errors in the read-only storage region, the code area can easily be deleted or diverted to the other storage region.

Moreover, in accordance with another aspect of the present invention, there is provided a storage medium which comprises a read/write storage region, a first preliminary storage region for storing data to be stored in a defective sector occurring in the read/write storage region, a read-only storage region and a second preliminary storage region provided in the vicinity of the read-only storage region for storing data to be stored in a defective sector occurring in the read-only storage region.

Thereby, the certification processing of the read/write storage region and that of the read-only storage area can separately be effected.

Consequently, by performing the method of the present invention, processing of defective sectors can suitably be effected even when a RAM region and a ROM region coexist in a storage medium.

In accordance with further another aspect of the present invention, a storage medium having a disk-like storage region, which comprises a plurality of concentric-circular-ring-like read-only storage areas provided in the disk-like storage region and concentric-circular-ring-like read/write storage regions each interposed between the concentric-circular-ring-like read-only storage areas, wherein update information to be used for updating information stored in each of the concentric-circular-ring-like read-only storage areas is written to an adjacent one of the concentric-circular-ring-like read/write storage regions.

Thereby, a seek time as well as the movement of a reading head is decreased. Thus data can be transferred to a host computer at a high speed.

In accordance with still another aspect of the present invention, there is provided a storage medium having a disk-like storage region, which comprises a concentric-partial-sector-like read-only storage area which is a part of a concentric ring-like storage area bounded by an inner and outer arcs and two radii of the disk-like storage region and a read/write storage area provided in a part of the disk-like storage region other than the read-only storage area, wherein update information to be used for updating information stored in said read-only storage area is written to a part of the read/write storage area, which is the remaining part of the concentric ring-like storage area of the disk-like storage region.

Thereby, a high-speed seek operation can be achieved and data can be transferred to a host computer at a high speed. Further, by storing the update information in a part of the read/write storage region in the neighborhood of the inner and outer arcs of the read-only storage region, a seek time required in a read or write operation can be decreased even if all of the remaining part of the concentric ring-like portion of the disk-like storage region is used up.

In accordance with yet another aspect of the present invention, there is provided a storage medium having a disk-like storage region, which comprises a plurality of concentric-partial-sector-like read-only storage areas, each of which is a part of a concentric ring-like storage area bounded by an inner and outer arcs and two radii of the disk-like storage region, the read-only storage areas being provided in the disk-like storage region in such a manner that the read-only storage areas do not coexist in the same concentric ring-like storage area of the disk-like storage region and read/write storage areas provided in a part of the disk-like storage region other than the read-only storage areas and respectively corresponding to the read-only storage areas, each of the read/write storage areas coexisting with a corresponding one of the read-only storage areas in the same concentric ring-like storage area of the disk-like storage region, wherein update information to be used for updating information stored in each of the read-only storage areas is written to a corresponding one of the read/write storage areas.

Thereby, each of the read/write areas can exclusively used for storing update information for updating data stored in the corresponding read-only storage area which coexists in the same concentric ring-like portion of the storage region.

In accordance with a still further aspect of the present invention, there is provided a storage medium having a disk-like storage region, which comprises a concentric-ring-like read-only storage area provided in said disk-like storage region, a concentric-partial-sector-like read-only storage area, each of which is a part of a concentric ring-like storage area bounded by an inner and outer arcs and two radii of the disk-like storage region and read/write storage areas provided in a part of the disk-like storage region other than the read-only storage areas, wherein update information to be used for updating information stored in the concentric-ring-like read-only storage area is written to one of the read/write storage areas, which is in the vicinity of the concentric-ring-like read-only storage area, and update information to be used for updating information stored in the concentric-partial-sector-like read-only storage area is written to one of the read/write storage areas, which is included in the concentric ring-like storage area.

Thereby, a user can make a good use of the optical disk according to characteristics in shape of the ring-like and partial-ring-like (or partial-sector-like) read-only storage areas. Further, by using a part of the storage region outside the concentric-ring-like storage area as a read/write storage storage area for storing the update information to be used for updating data stored in the concentric-partial-sector-like read-only storage area, more update information can be stored in the optical disk.

Thus a seek time can be reduced and data can be transferred to a host computer at a high speed by providing a ring-like or partial-sector-like ROM area in a RAM area of a storage region of an optical disk. In accordance with yet another aspect of the invention, there is provided a method for managing defective sectors in a storage medium in which a read/write storage region and a read-only storage region coexist, comprising the steps of (i) if a defective sector is initially present in the read/write storage region, assigning logical addresses to sectors of the read/write storage region by slipping the defective sector and, if a defective sector is initially present in the read-only storage region, storing data, which should be stored in the defective sector of the read-only storage region, in a preliminary storage region, and (ii) if a defective sector occurs in the read/write storage region thereafter, storing data, which should be stored in the defective sector of the read/write storage region, in the preliminary storage region.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
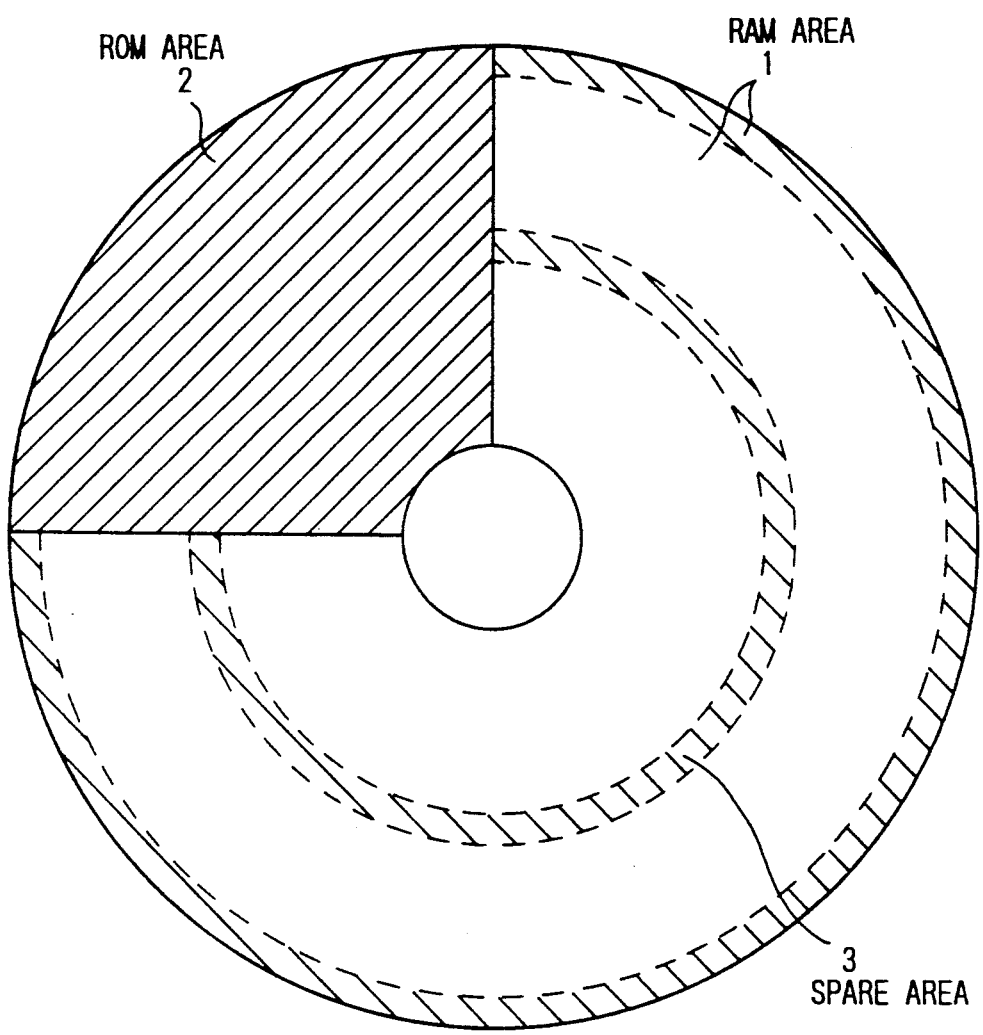
FIG. 1 is a diagram for illustrating a first embodiment of the present invention.
Figure 2:
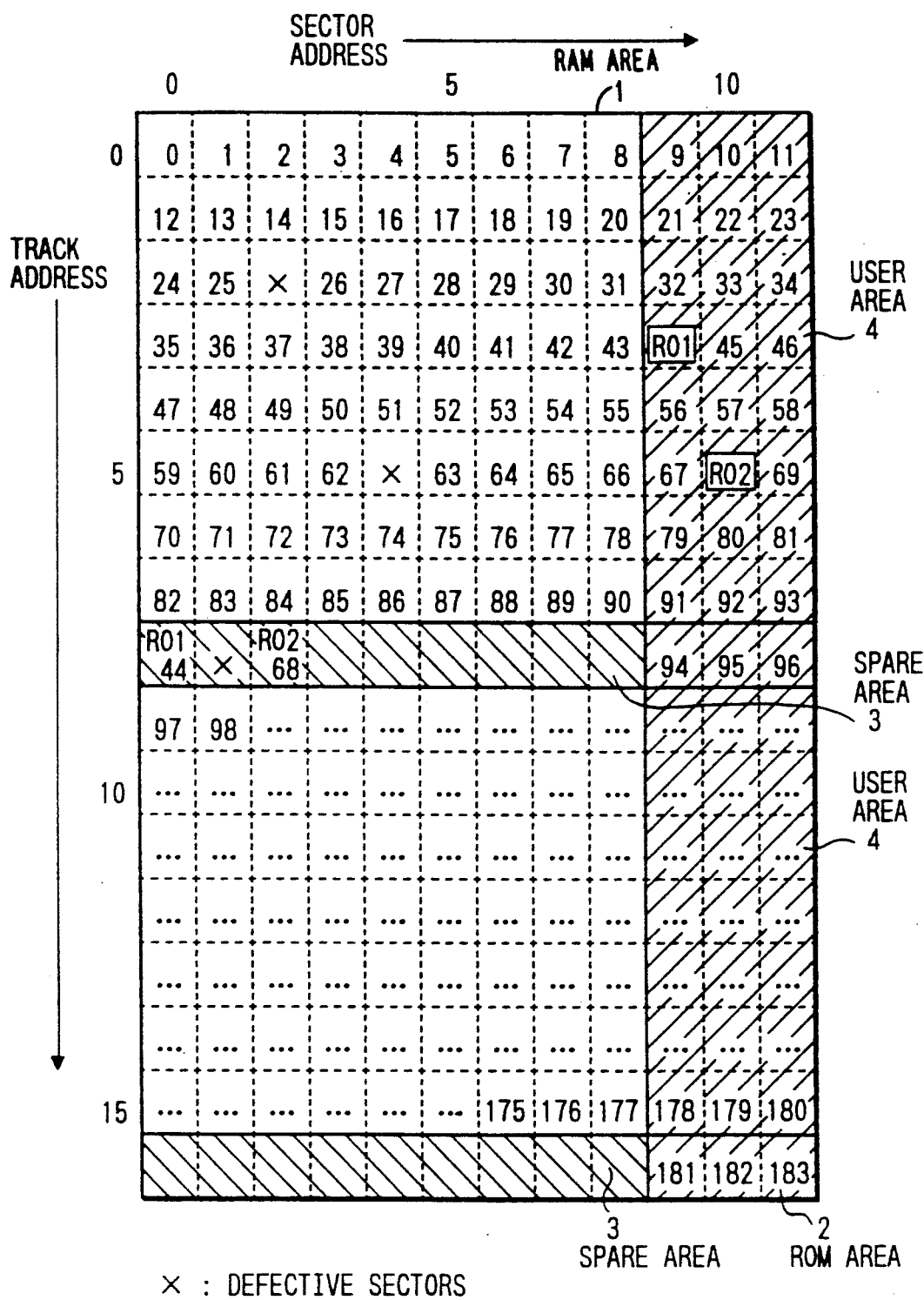
FIGS. 2 and 3 are diagrams each for illustrating a processing of defective sectors in the first embodiment, of which the sectors are represented by using square cells.
Figure 3:
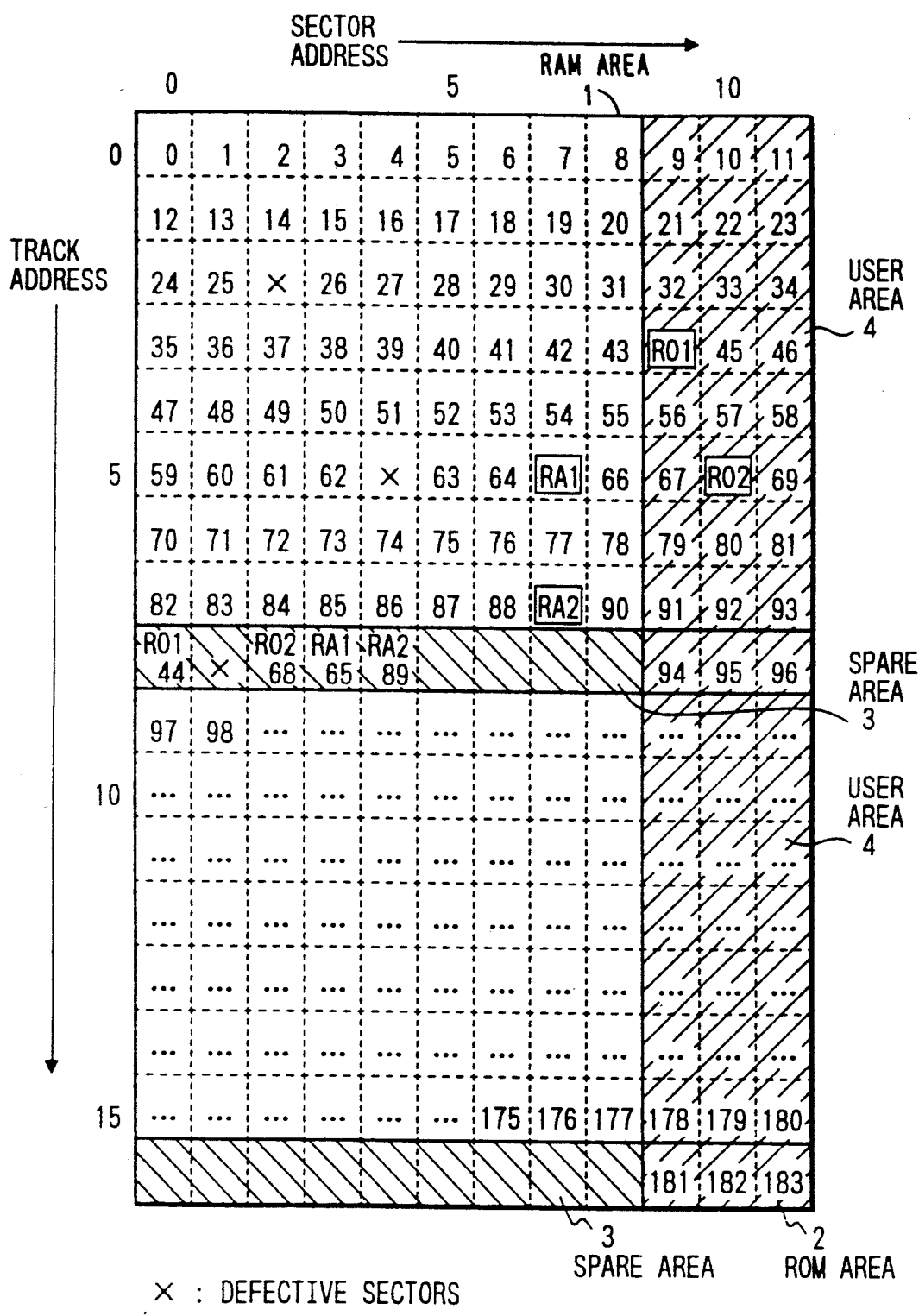

FIGS. 1 to 3 are diagrams for illustrating a first embodiment of the present invention. As shown in FIG. 1, a storage region of an optical disk is composed of a partial-sector-like read-only storage area 2 (hereunder referred to as a ROM area) and a read/write storage area 1 (hereunder referred to as a RAM area) provided in a part other than the ROM area 2. In the RAM area 1, two concentric-partial-ring-like areas are provided as spare areas 3. In the spare areas 3, data is stored which was to be stored in defective sectors of the RAM area 1 and the ROM area 2.

FIGS. 2 and 3 are diagrams each for illustrating SDM and LDM to be effected for managing defective sectors in the embodiment, of which the sectors are represented by using square cells, of FIG. 1. In case where the RAM area 1 and the ROM area 2 coexist in the storage region as shown in FIG. 1, a trouble in detecting an initial defective sector and performing Certification is that SDM cannot be performed on the ROM area 2 because a write operation for checking cannot be performed thereon. However, because information on an error correction code is stored in sectors and (parity) code areas are included in other sectors, the position of a sector which includes a defect or error can be detected and the error can be corrected. Therefore, as shown in FIG. 2, SDM is performed only on the RAM area 1 and logical addresses are assigned to sectors of the RAM 1 by slipping defective sectors thereof. In contrast, logical addresses are assigned to all of sectors of the ROM area 2 without slipping defective sectors thereof. However, data cannot be read from defective sectors RO1 and RO2 of the ROM area RO2 due to degradation of the optical disk. If data to be stored in defective sectors are saved by reading the other code area after a read instruction from the host computer reaches the optical disk, performance or efficiency of a system including the host computer and the optical disk is deteriorated. Certification is, therefore, preliminarily achieved by saving data of only defective sectors of the ROM area 2 to alternate sectors of the spare area 3 by using LDM.

FIG. 3 is a diagram for illustrating a state of the optical disk in which data to be stored in the defective sectors RA1 and RA2 are saved in alternate sectors of the spare area 3 by performing LDM in case where the defective sectors RA1 and RA2 occur in the RAM area 1 after the certification of the optical disk effected as illustrated in FIG. 2.

Figure 4:
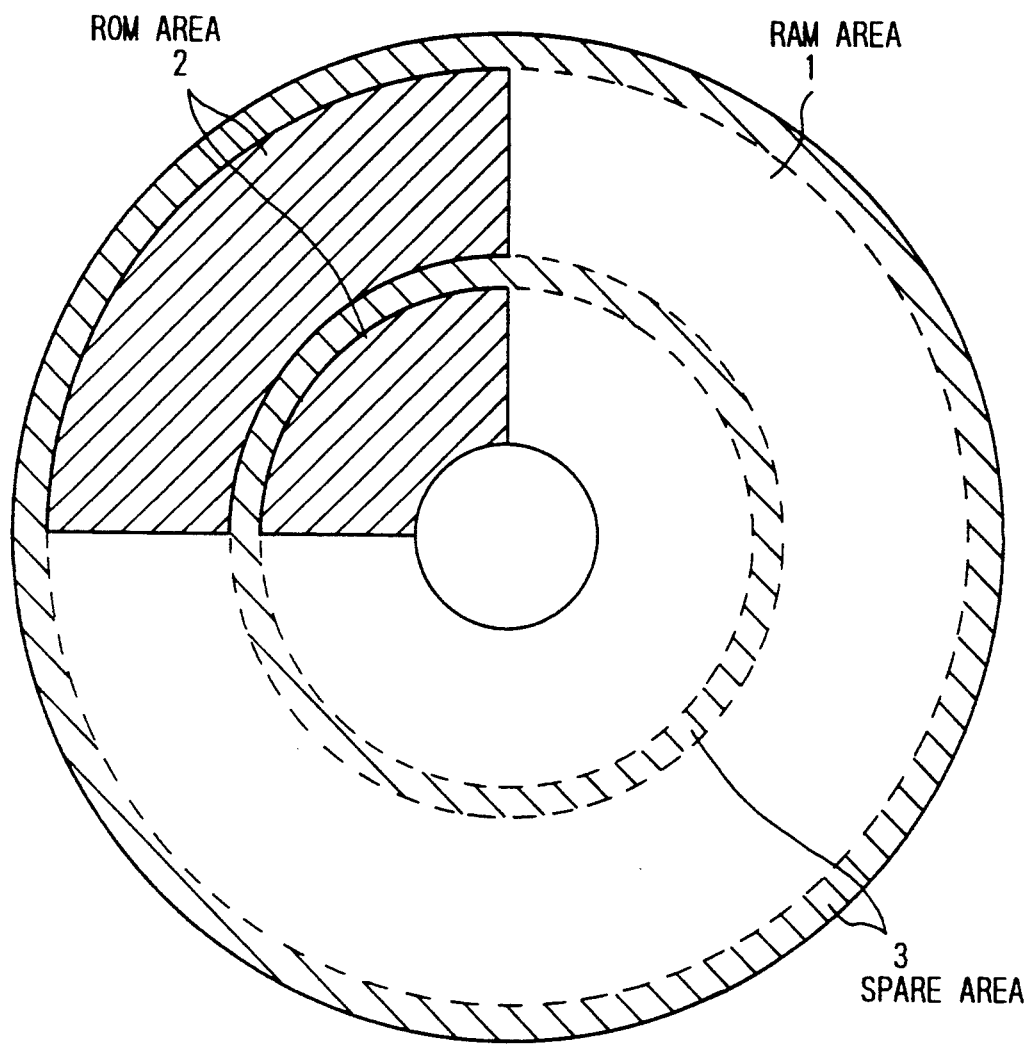
FIG. 4 is a diagram for illustrating a second embodiment of the present invention.
Figure 5:
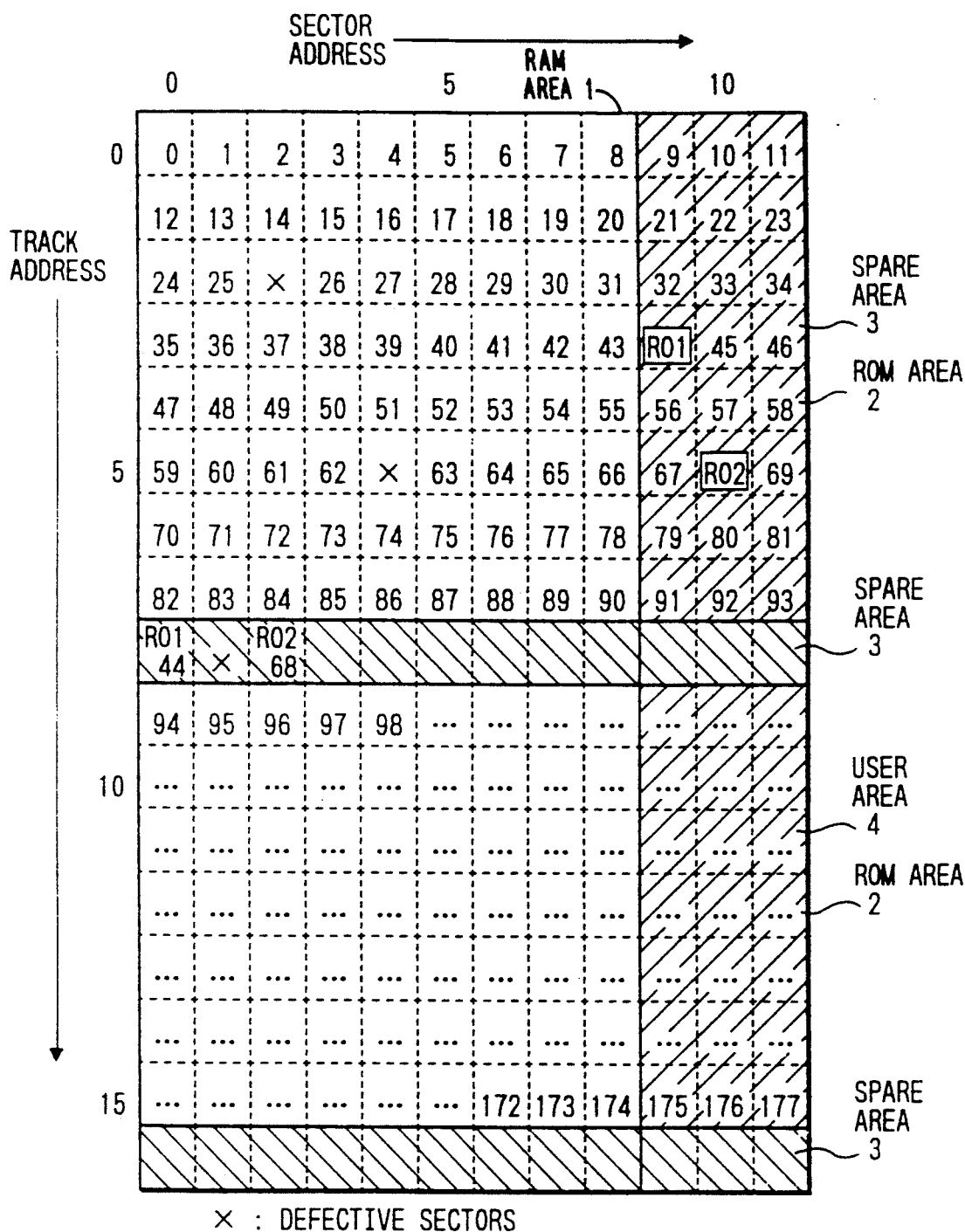
FIG. 5 is a diagram for illustrating a processing of defective sectors in the second embodiment, of which the sectors are represented by using square cells.

Next, a second embodiment of the present invention will be described hereinbelow by referring to FIGS. 4 and 5. FIG. 4 is a diagram for illustrating the optical disk provided with the storage region having complete-ring-like spare areas 3, each of which is obtained by extending the partial-ring-like spare area of FIG. 1 into the partial-sector-like ROM area 2 thereof. FIG. 5 is a diagram for illustrating how LDM and SDM are performed on the second embodiment, of which the sectors are represented by using square cells. In case of the second embodiment, certification is performed similarly as in case of the first embodiment. Thereafter, if defective sectors occur in the RAM area 1 and the ROM area 2, data to be stored in the defective sectors can be saved in alternate sectors of the spare area 3 by effecting LDM.

Figure 6:
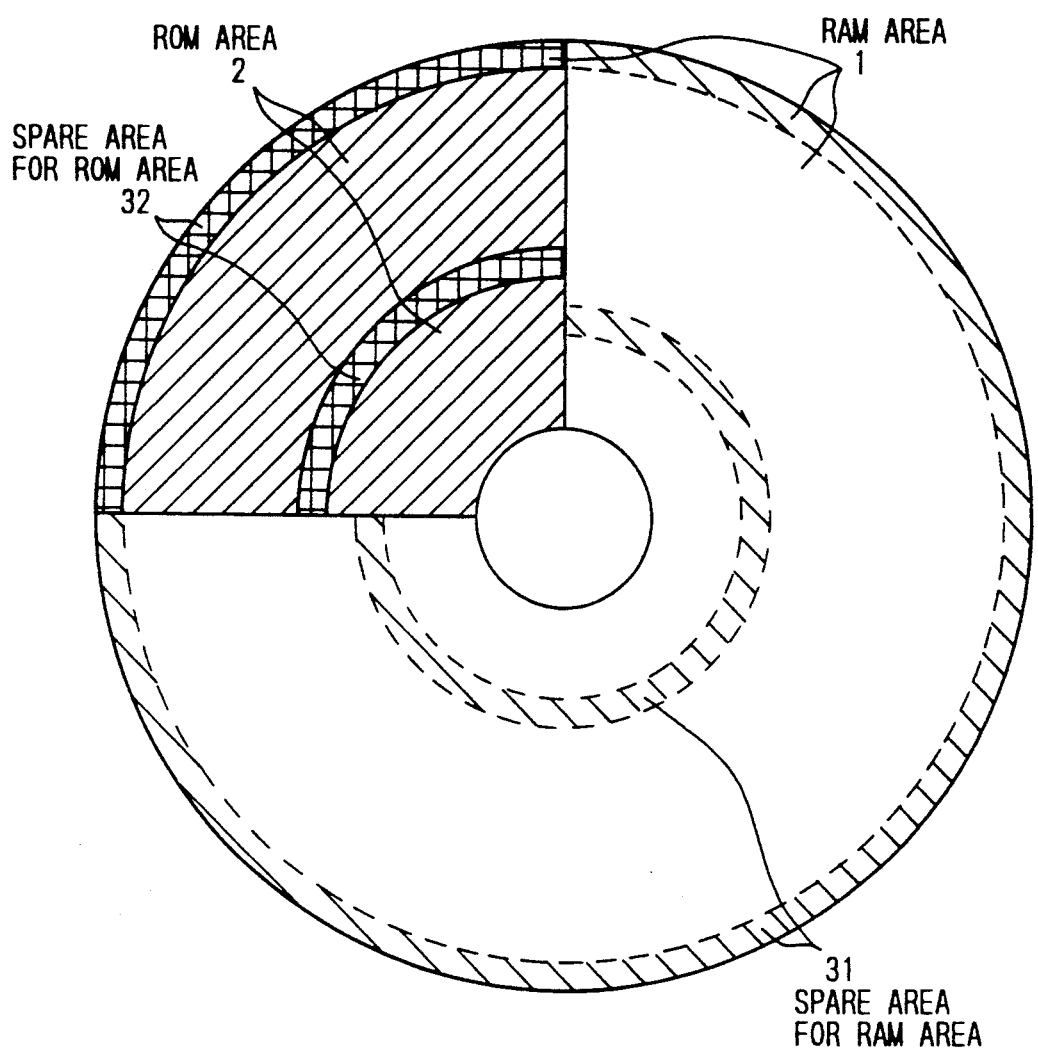
FIG. 6 is a diagram for illustrating a third embodiment of the present invention.

Next, a third embodiment of the present invention will be described hereinbelow by referring to FIGS. 6 and 7. In contrast with the first and second embodiments in which the spare areas 3 are used in common by storing data to be stored in defective sectors of the RAM area 1 and the ROM area 2, a spare area 31 dedicated to store data to be stored in defective sectors of the RAM area 1 and another spare area 32 dedicated to store data to be stored in defective sectors of the ROM area 2 are separately provided in the third embodiment. As the result, the RAM area 1 and the ROM area 2 can separately be managed. Therefore, the certification of the RAM area 1 can be performed separately from that of the ROM area 2. For instance, when a user uses the optical disk for the first time, or when formatting the optical disk, the certification is performed on both of the RAM area 1 and the ROM area 2. Thereafter, it can be realized that when a re-formatting of the optical disk is required, the spare area 32 is not deleted but maintained and the certification is performed only on the RAM area 1. Thereby, efficiency in re-formatting (or in performing Certification) can be increased.

Figure 7:
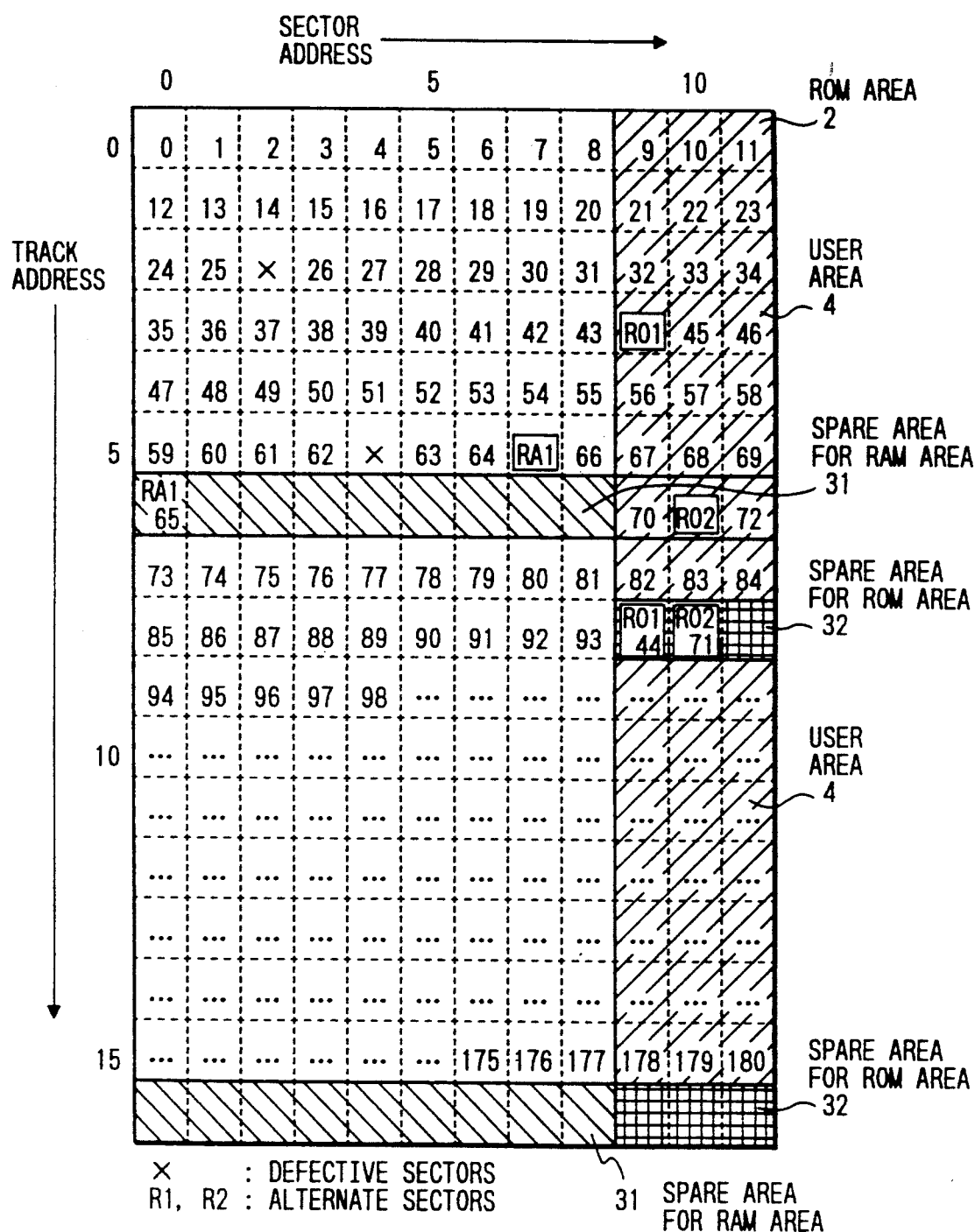
FIG. 7 is a diagram for illustrating a processing /f defective sectors in the third embodiment, of which the sectors are represented by using square cells.

FIG. 7 is a diagram for illustrating a state of the optical disk on which LDM is performed in case where a defective sector occurs in the RAM area 1 after the certification is performed on both of the RAM area 1 and the ROM area 2.

Figure 8:
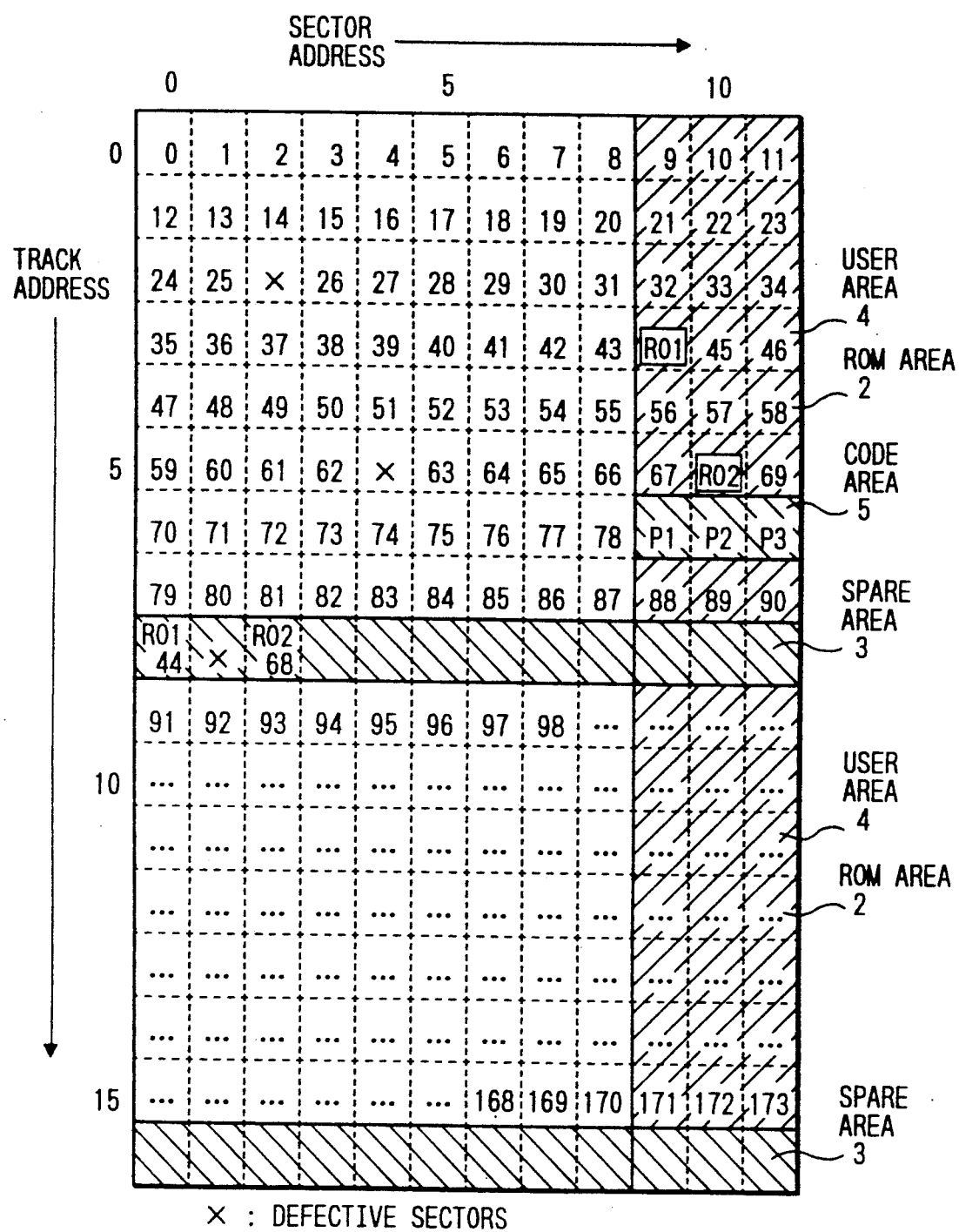
FIG. 8 is a diagram for illustrating a processing of a code area in a fourth embodiment, of which the sectors are represented by using square cells.

Next, a fourth embodiment of the present invention will be described hereinbelow by referring to FIGS. 4 and 8. In case where a (parity) code area 5 is included in the ROM area 2 among the RAM area 1, the ROM area 2 and the spare area 3 illustrated in FIG. 4, logical numbers or addresses are not assigned to sectors of the code area 5 (namely, the sectors of the code area 5 are slipped) in case of the fourth embodiment as illustrated in FIG. 8. Thereby, when the code area 5 become unnecessary later (namely, no defects or errors occur in the ROM area 2), theoretically, the code area 5 can physically be deleted from the optical disk or can be used as another area (e.g., a RAM area). If logical addresses are assigned to sectors of the code area 5, a user can recognize the presence of the code area 5, namely, the presence of unnecessary data in the optical disk. The defect management hides the presence of unnecessary data from a user (namely, makes unnecessary data invisible).

Figure 9:
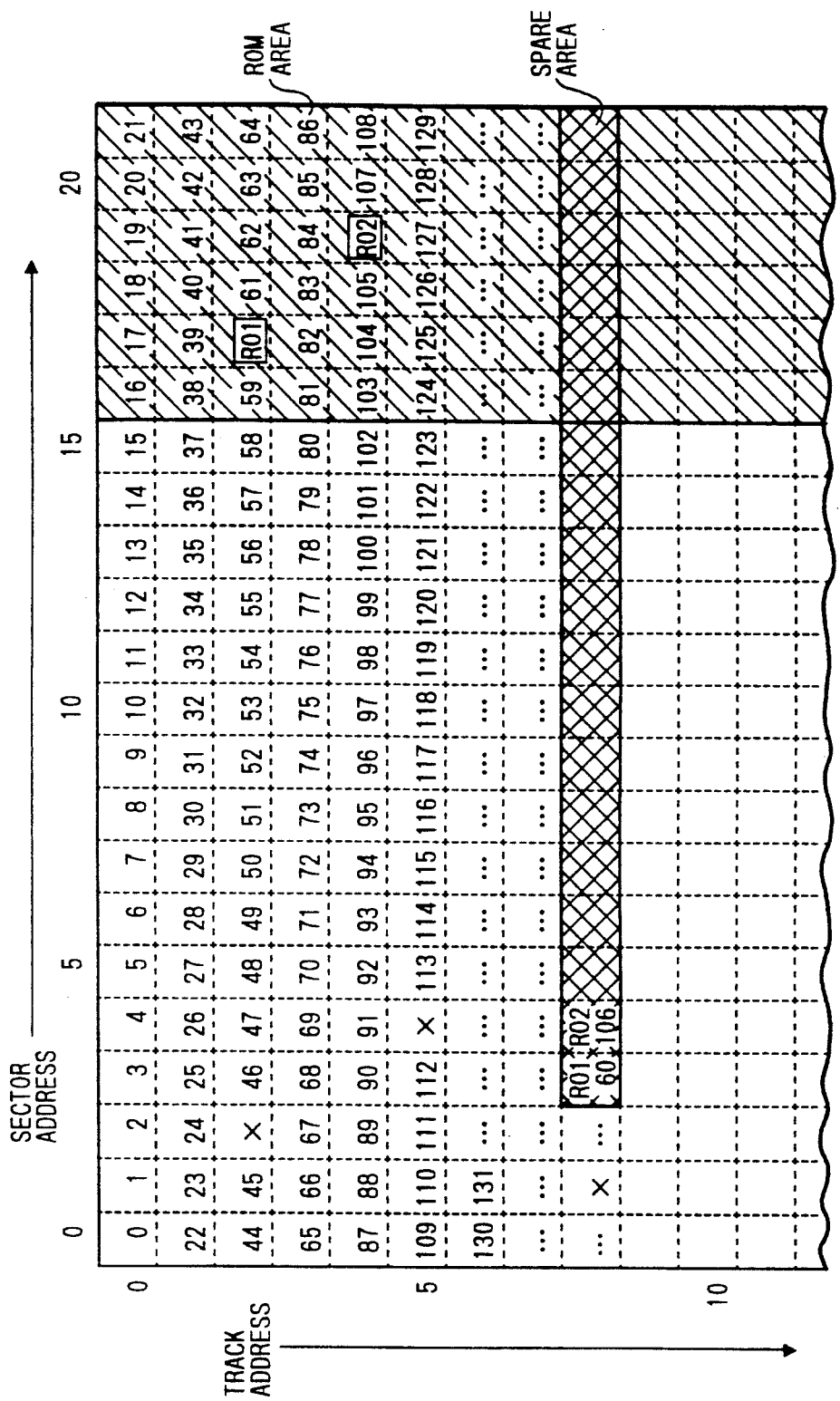
FIG. 9 is a diagram for illustrating a processing of defective sectors in a fifth embodiment, of which the sectors are represented by using square cells.

Further, a fifth embodiment of the present invention will be described hereinbelow. A spare area 3 of the fifth embodiment is the same as the spare area 3 of FIG. 4 and a used in common for storing data to be stored in defective sectors of a RAM area 1 and a ROM area 2. Practical differences between the fifth embodiment and the second embodiment will be described hereinafter by referring to FIG. 9 which is a diagram for illustrating how SDM and LDM are performed on sectors of FIG. 4 included in the fifth embodiment, of which the sectors are represented by using square cells. In case of the fifth embodiment, SDM is performed only on the RAM area 1 and logical addresses are assigned to sectors of the RAM area 1 by slipping defective sectors thereof but logical addresses are assigned to sectors of the ROM 2 without slipping defective sectors thereof, similarly as in case of the first embodiment. Further, only data to be stored in the defective sectors of the ROM area 2 are saved by writing corrected data to alternate sectors of the spare area 3 by performing LDM. In case of the fifth embodiment, alternate sectors of the spare area 3 other than alternate sectors of the number equal to that of defective sectors of the RAM area 1, on which SDM is performed, are assigned to defective sectors of the ROM area 2. Namely, as illustrated in FIG. 9, an alternate sector of the spare area 3, of which the physical sector number or address (hereunder referred to simply as the sector address) and the physical track number or address (hereunder referred to as the track address) are 3 and 8, respectively, and another alternate sector of the spare area 3, of which the sector address and the track address) are 4 and 8, respectively, are used for storing data to be stored in the defective sectors RO1 and RO2, respectively. Thereby, the management of defect sectors of each zone can be facilitated.

Figure 10:
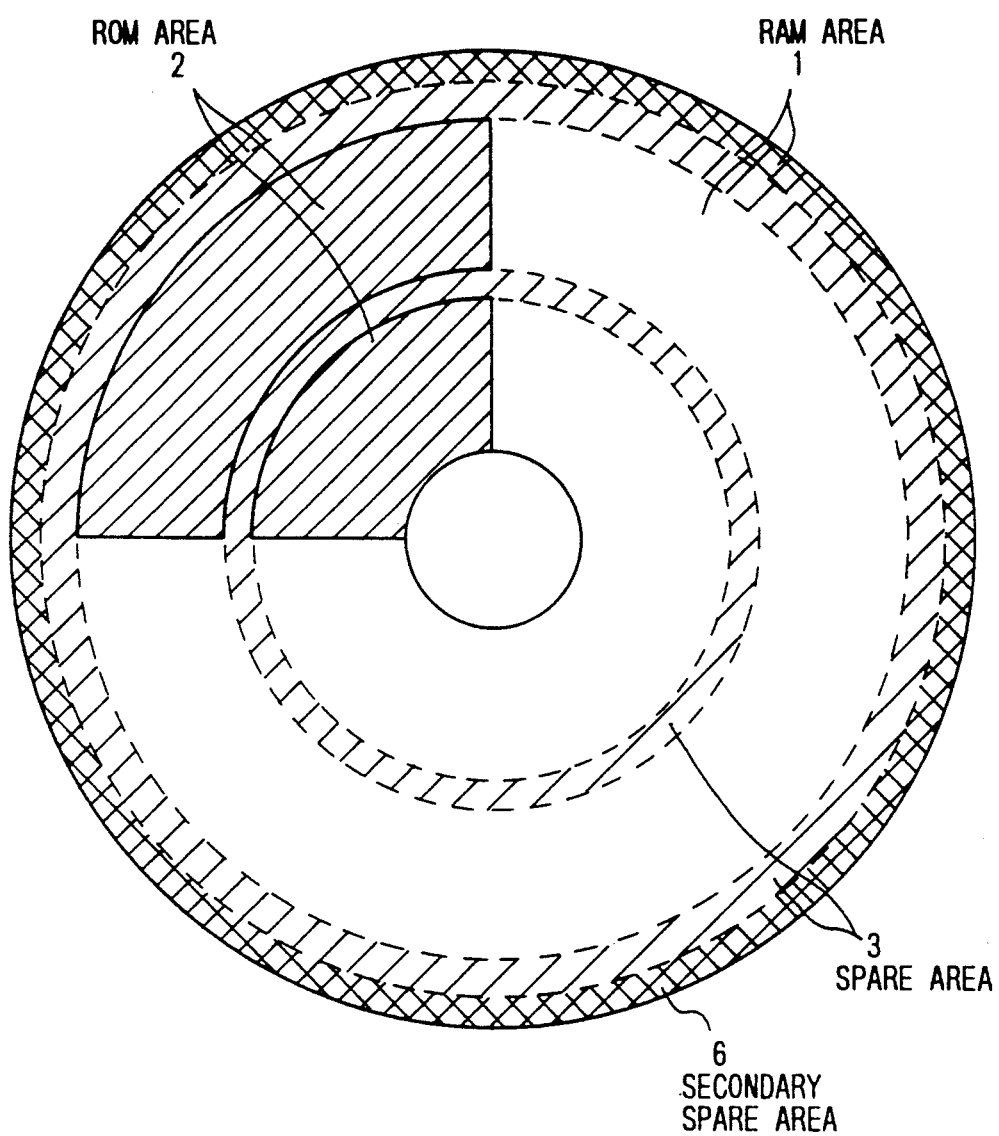
FIG. 10 is a diagram for illustrating a sixth embodiment of the present invention.
Figure 11:
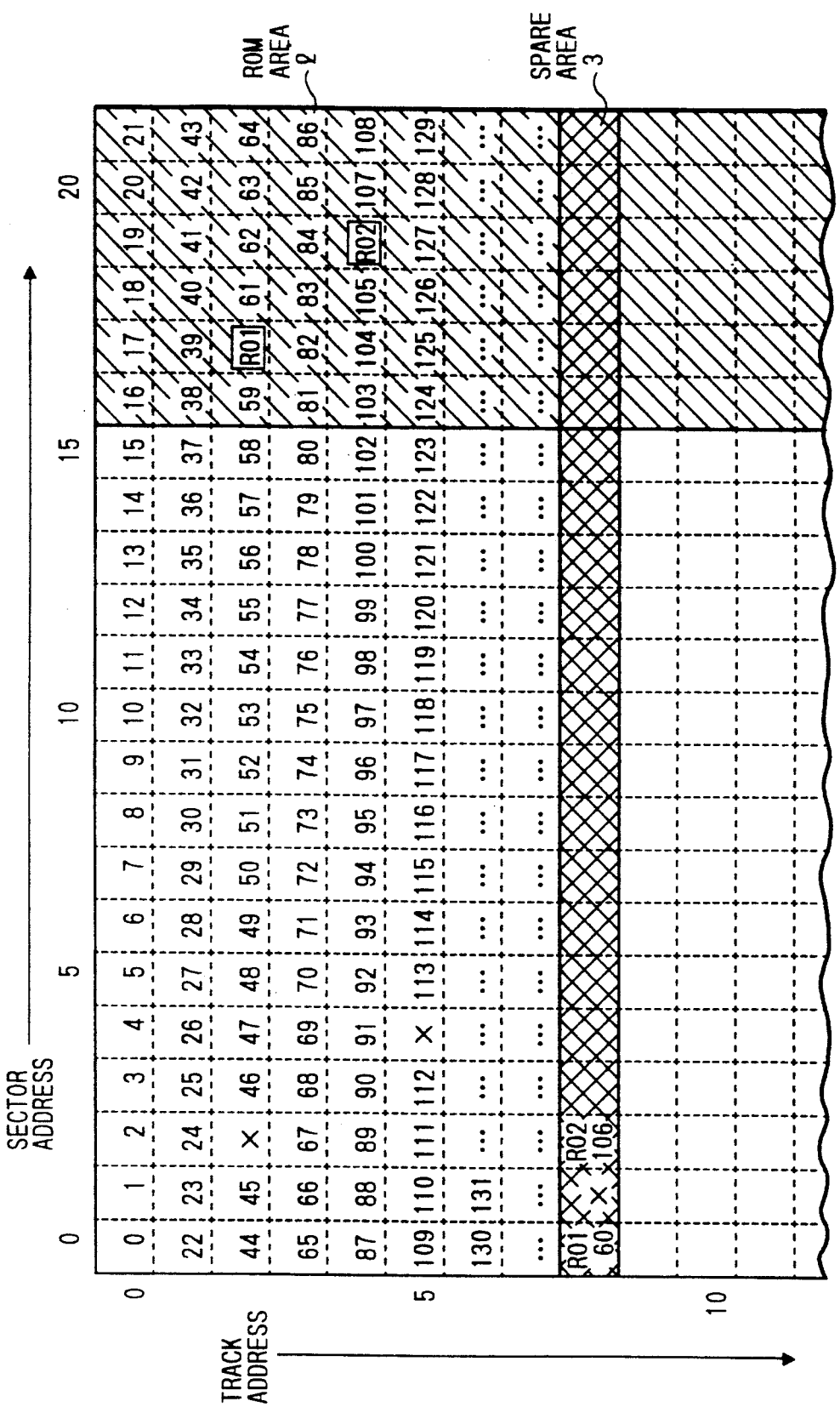
FIG. 11 is a diagram for illustrating a processing of defective sectors in the sixth embodiment, of which the sectors are represented by using square cells, of FIG. 10.
Figure 12:
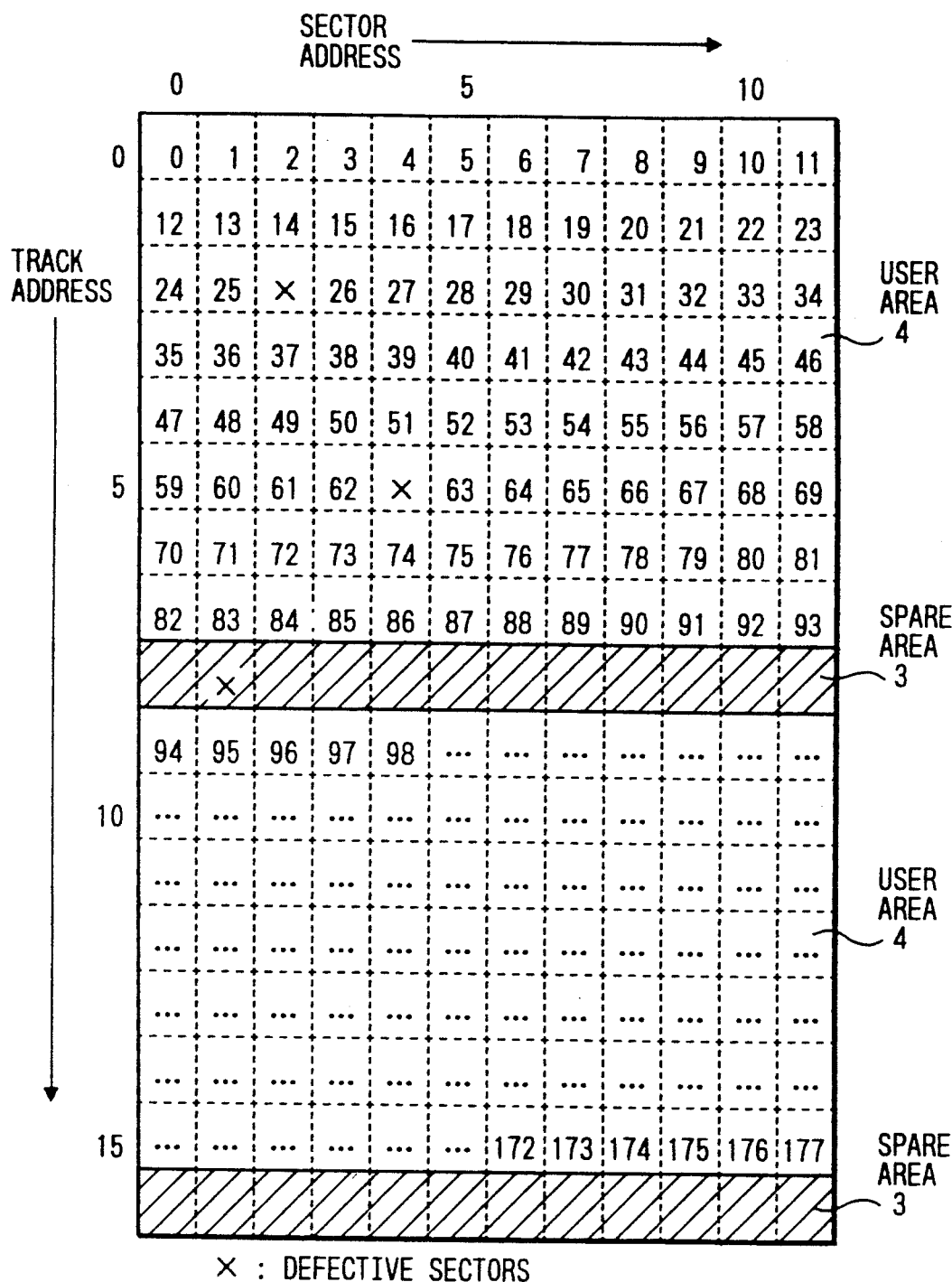
FIGS. 12 and 13 are diagrams each for illustrating a processing of defective sectors in a conventional RAM area.
Figure 13:
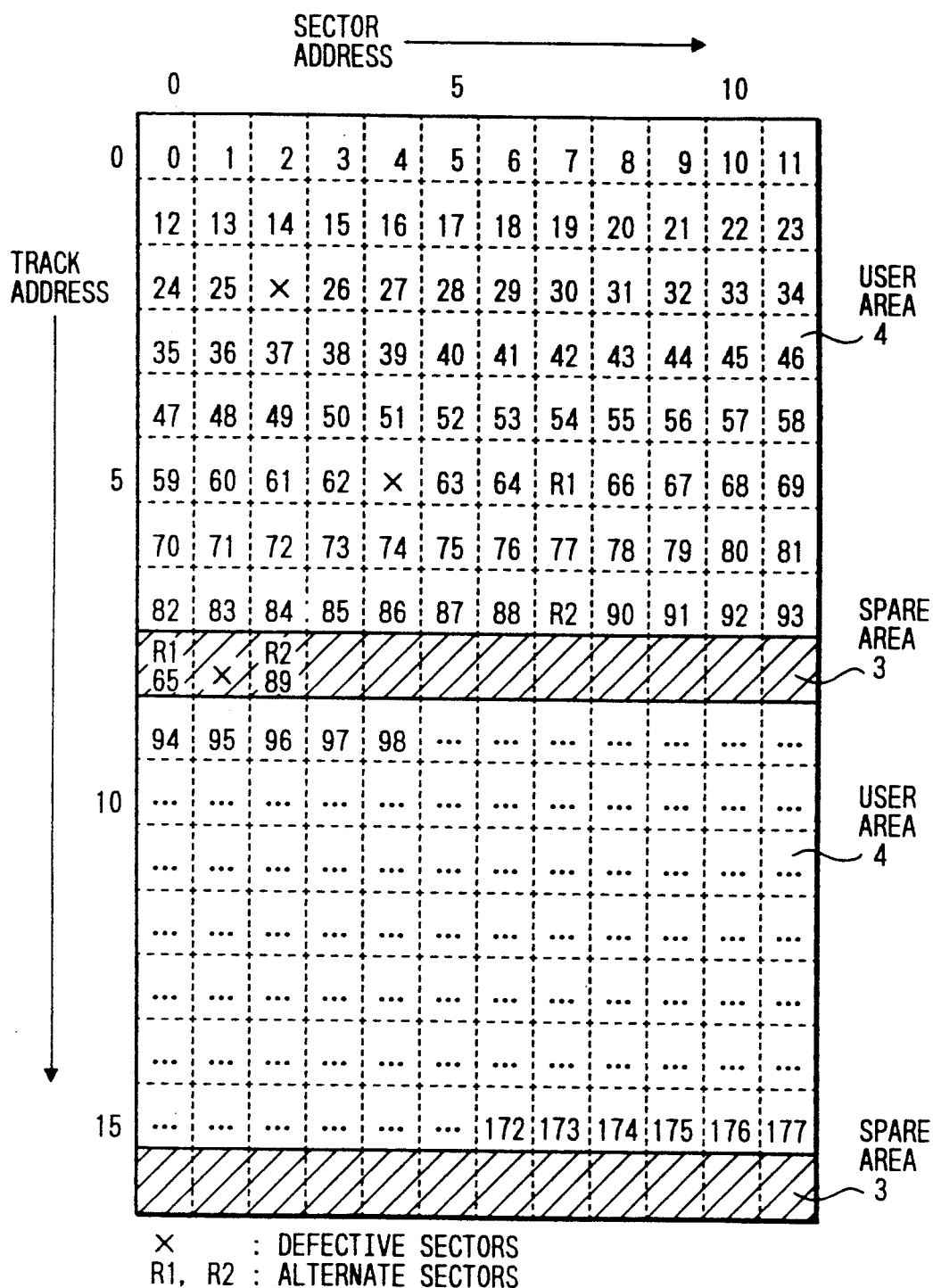

Next, a sixth embodiment of the present invention 7ill be described hereinbelow by referring to FIGS. 10 and 11. In the sixth embodiment, a secondary spare area is provided in an outermost peripheral portion of the storage region of the optical disk as shown in FIG. 10. In case of the sixth embodiment, SDM is performed only on the RAM area 1 and logical addresses are assigned to sectors of the RAM area 1 by slipping defective sectors thereof but logical addresses are assigned to sectors of the ROM 2 without slipping defective sectors thereof, similarly as in case of the fifth embodiment. The difference between the sixth embodiment and the fifth embodiment (see FIG. 9) resides in that as is apparent from FIG. 11, data to be stored in defective sectors of the ROM area 2 are stored in alternate sectors of the spare area without excluding alternate sectors of the number equal to that of defective sectors of the RAM area 1, on which SDM is performed. As is understood by comparing FIGS. 9 and 11, in case of employing this method, the logical address of the last sector of the RAM area 1 of each zone is shifted by the number of slipped sectors. Thus, in the sixth embodiment, the secondary spare area is provided in order to allocate alternate sectors of the secondary spare area to the slipped sectors.

Figure 14:
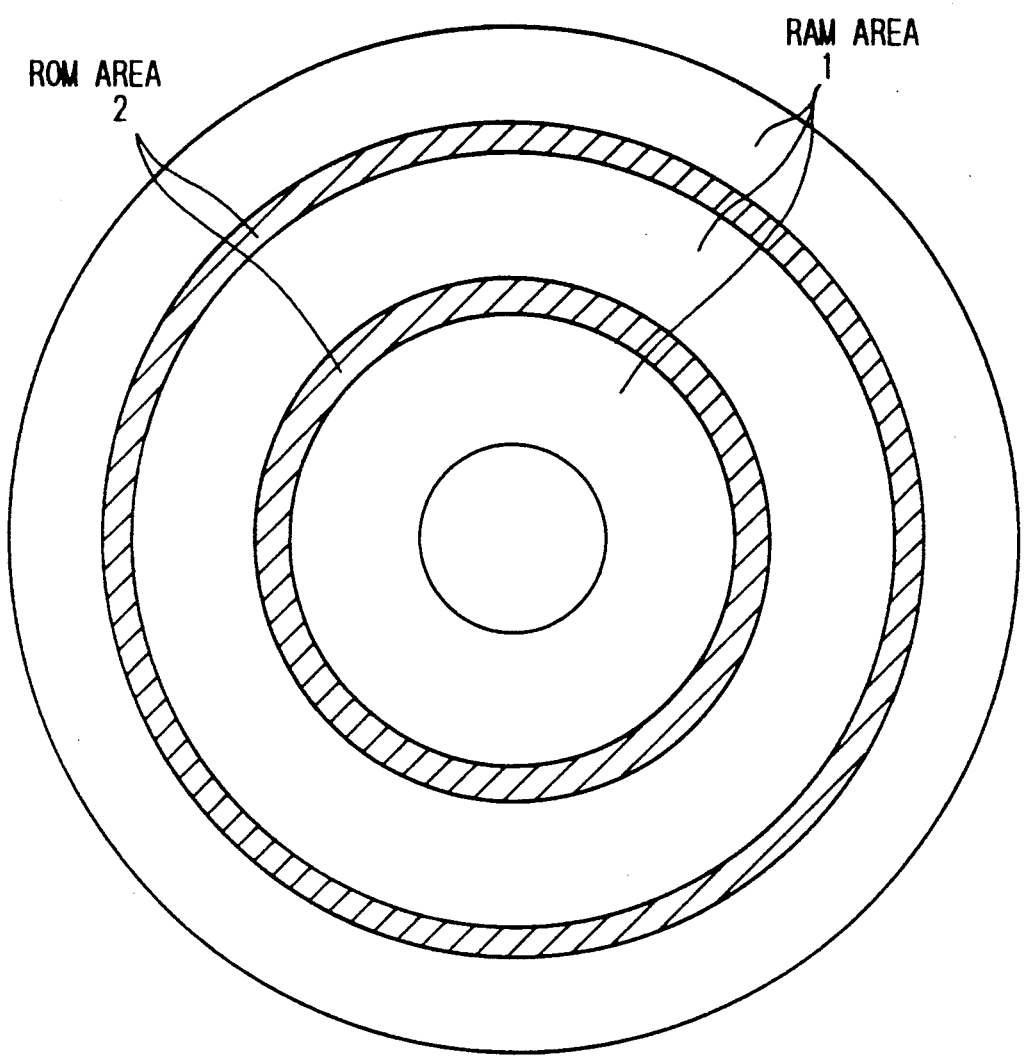
FIG. 14 is a diagram for illustrating the construction of a seventh embodiment of the present invention.
Figure 15:
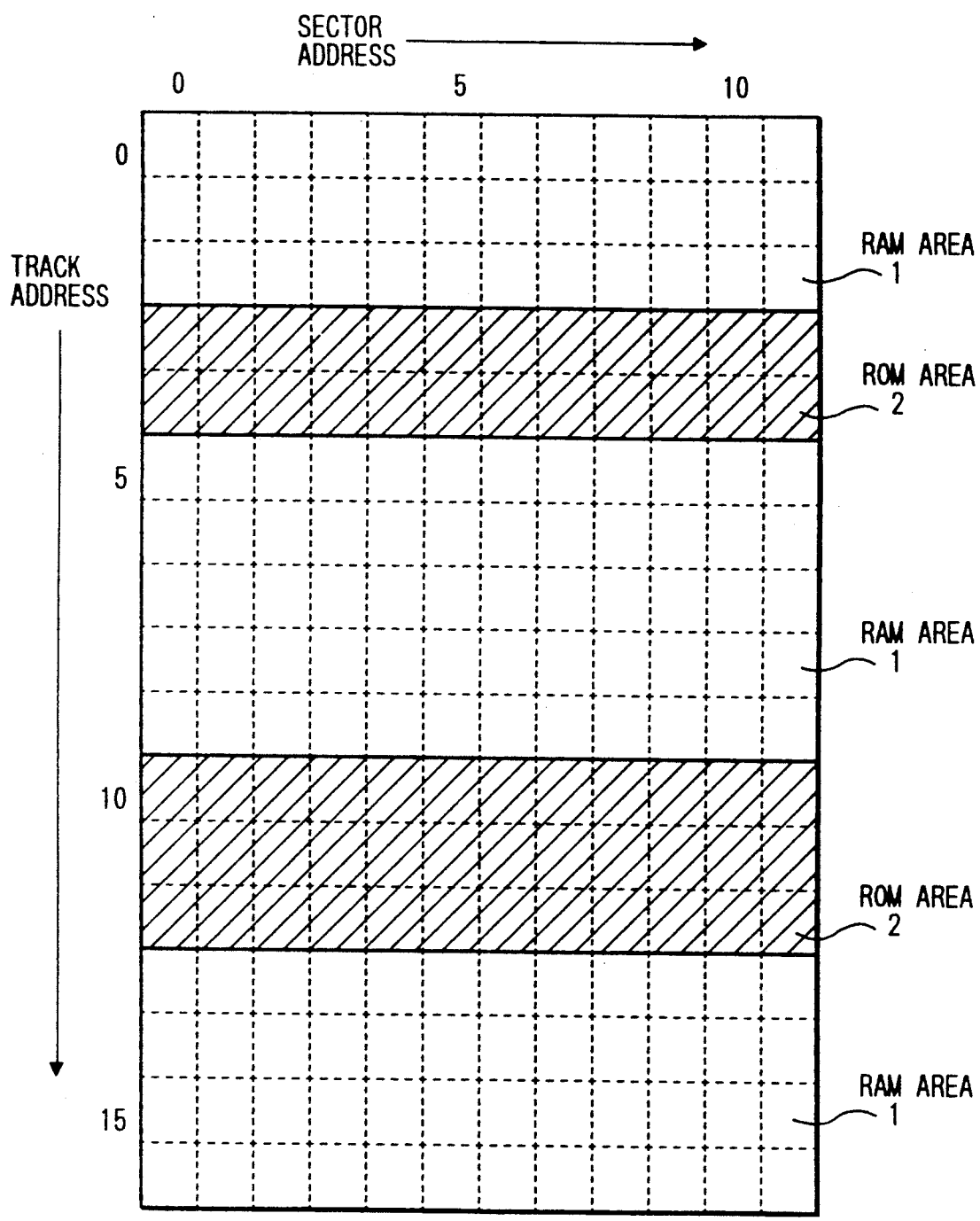
FIG. 15 is a diagram for illustrating the construction of the seventh embodiment of FIG. 14 by representing each sector by using a square cell.
Figure 25:
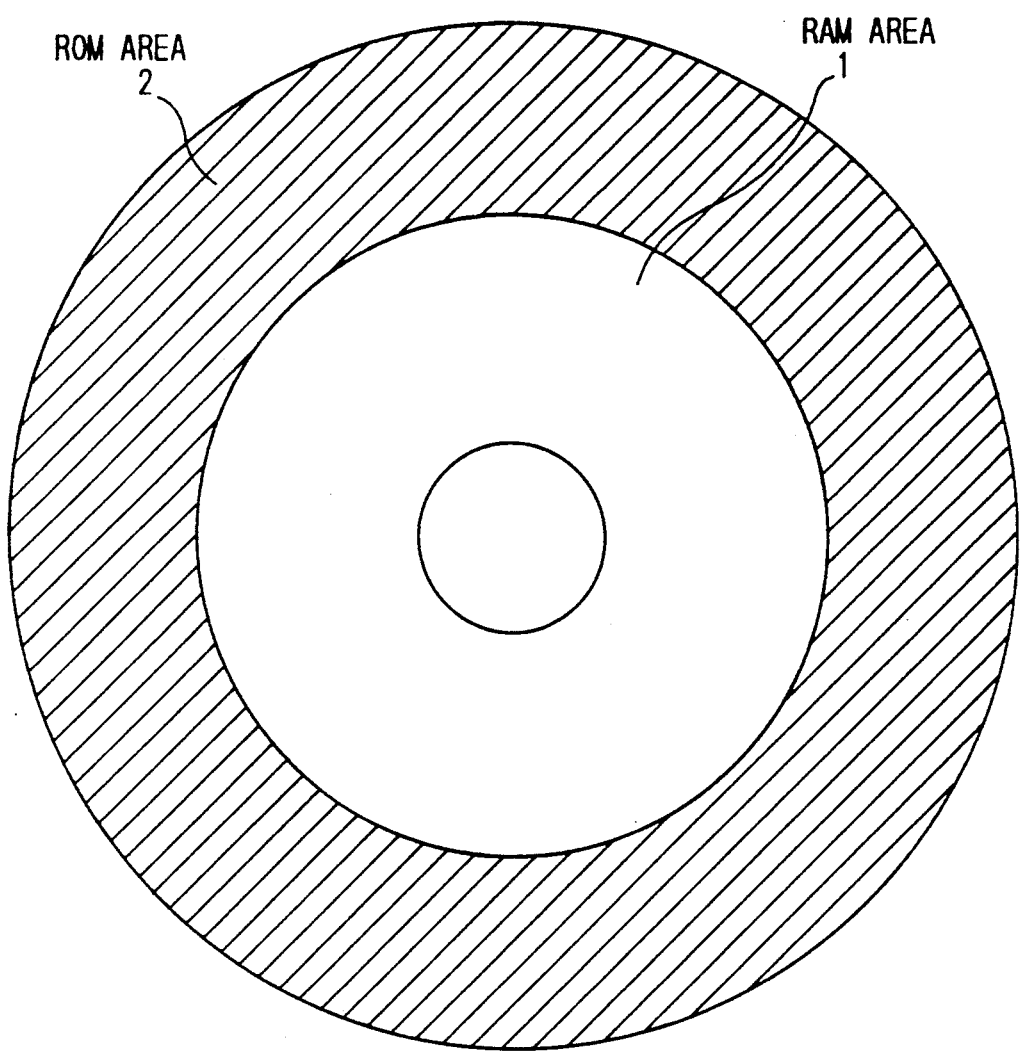
FIG. 25 is a diagram for illustrating the construction of a conventional optical disk.
Figure 26:
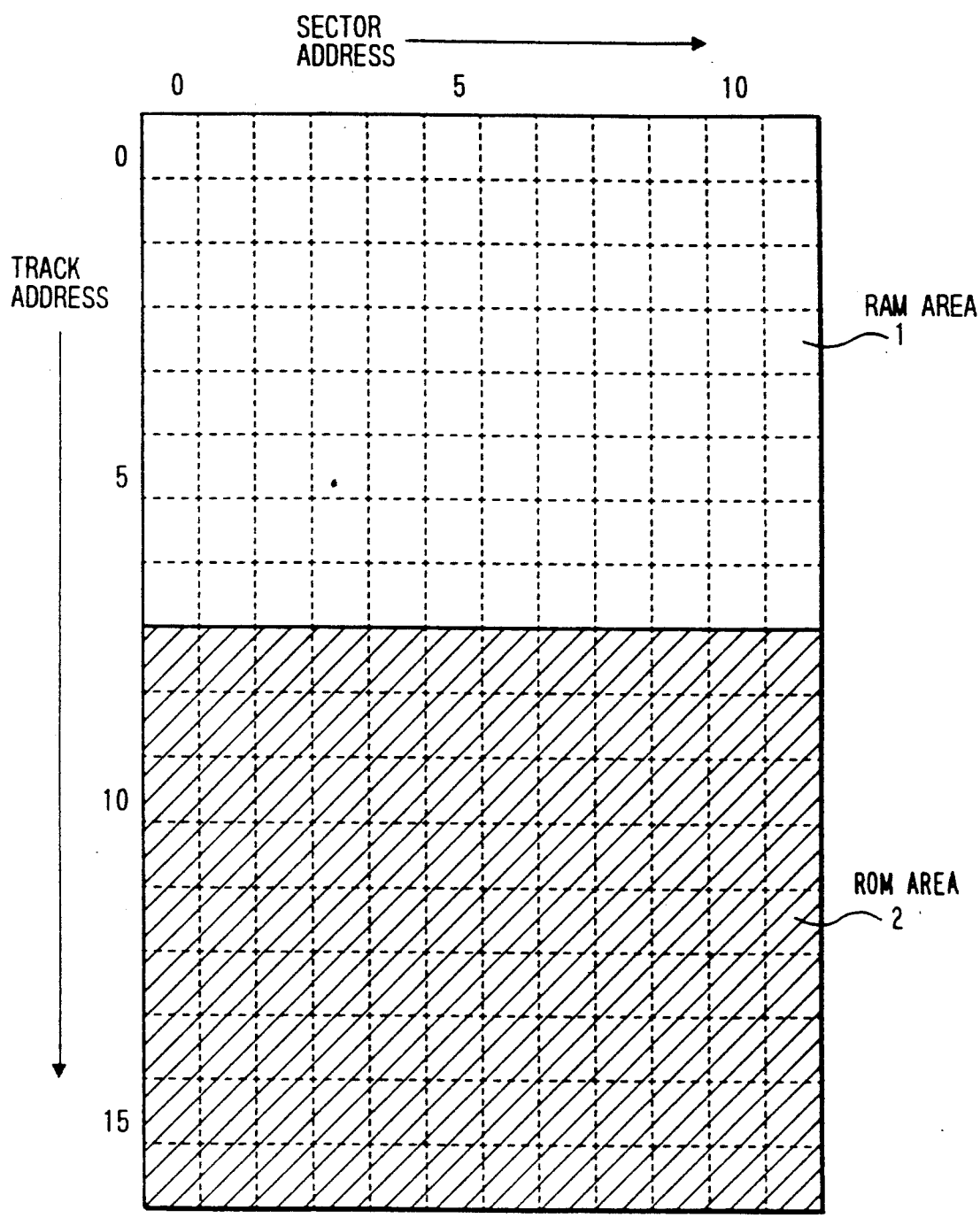
FIG. 26 is a diagram for illustrating the construction of the conventional optical disk of FIG. 25 by representing each sector by using a square cell.

Next, a seventh embodiment of the present invention will be described hereinbelow by referring to FIGS. 14 and 15. FIG. 14 is a diagram for illustrating the arrangement of the ROM area 2 and the RAM area 1 of the optical disk. FIG. 15 is a diagram for illustrating the arrangement of sectors of tracks in the ROM area 2 and the RAM area 1 by representing each sector by using a square cell. In the seventh embodiment, a plurality of the ROM areas 2 and a plurality of the RAM areas 1 are provided. Further, there is provided one track of the RAM area 1 in each of the ROM areas 2. Alternatively, there is provided a plurality of tracks of the RAM areas 1 in such a fashion to adjoin each of the ROM areas 2. Thereby, update information to be used for updating the contents of a ROM area 2 can be stored in the RAM area 1 which is as near as possible to the ROM area 2. For instance, in case where old data stored in a sector, of which the track address and the sector address are 3 and 0, respectively, should be updated, the latest update information is written to a sector, of which the track address and the sector address are 2 and 11, respectively. Thereby, a reduced seek time can be realized and data can be transferred to a host computer at a higher speed in comparison with the conventional arrangement of the ROM area 2 and the RAM area 1 of FIGS. 25 and 26.

Figure 16:
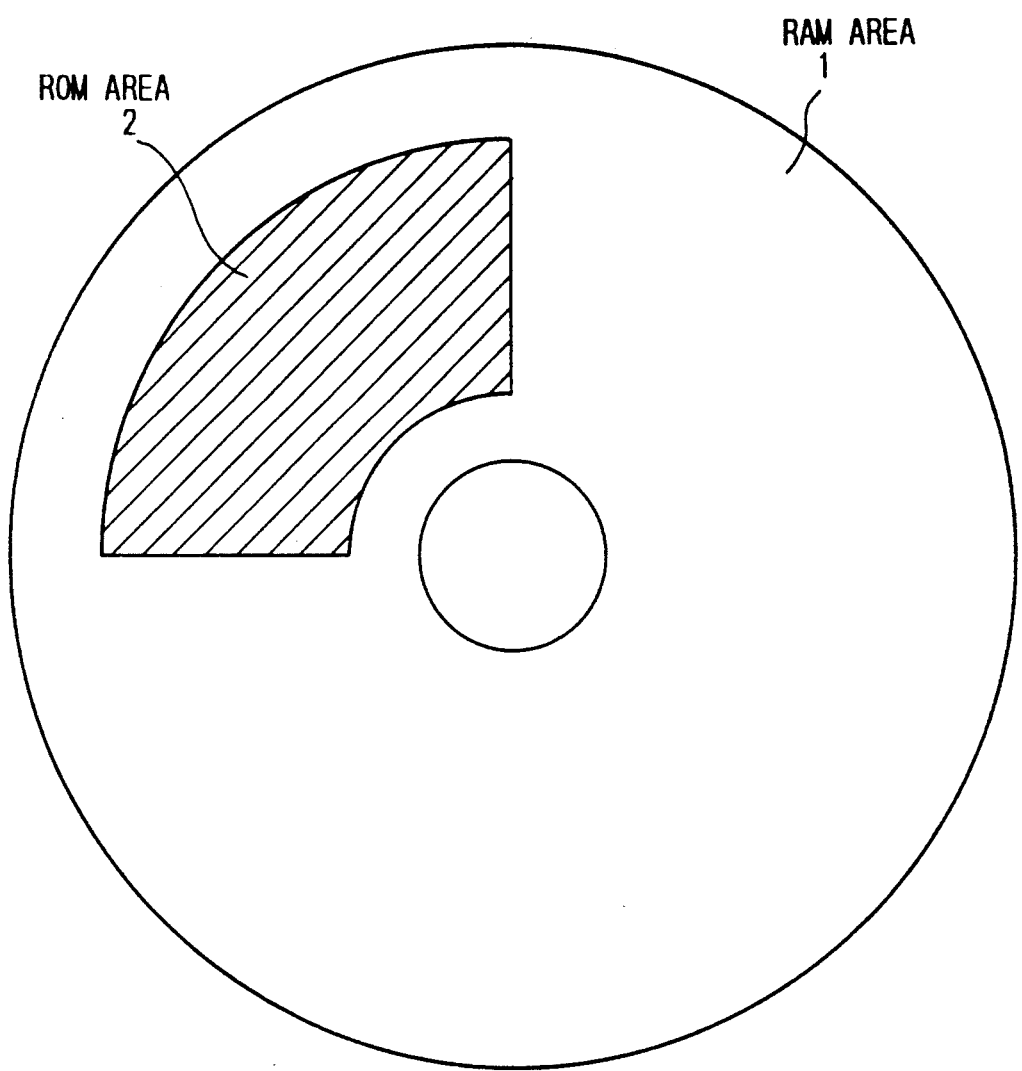
FIG. 16 is a diagram for illustrating an eighth embodiment of the present invention.

Next, an eighth embodiment of the present invention 7ill be described hereinbelow by referring to FIGS. 16 and 17. As is seen from FIG. 16, in case of the eighth embodiment, a partial-sector-like ROM area 2 is provided in a RAM area 1. The eighth embodiment is adapted to store update information for updating data stored in the ROM area 2 to the RAM area 1 on the same track or in the neighborhood of an outer or inner arc of the partial-sector-like ROM area 2.

Figure 17:
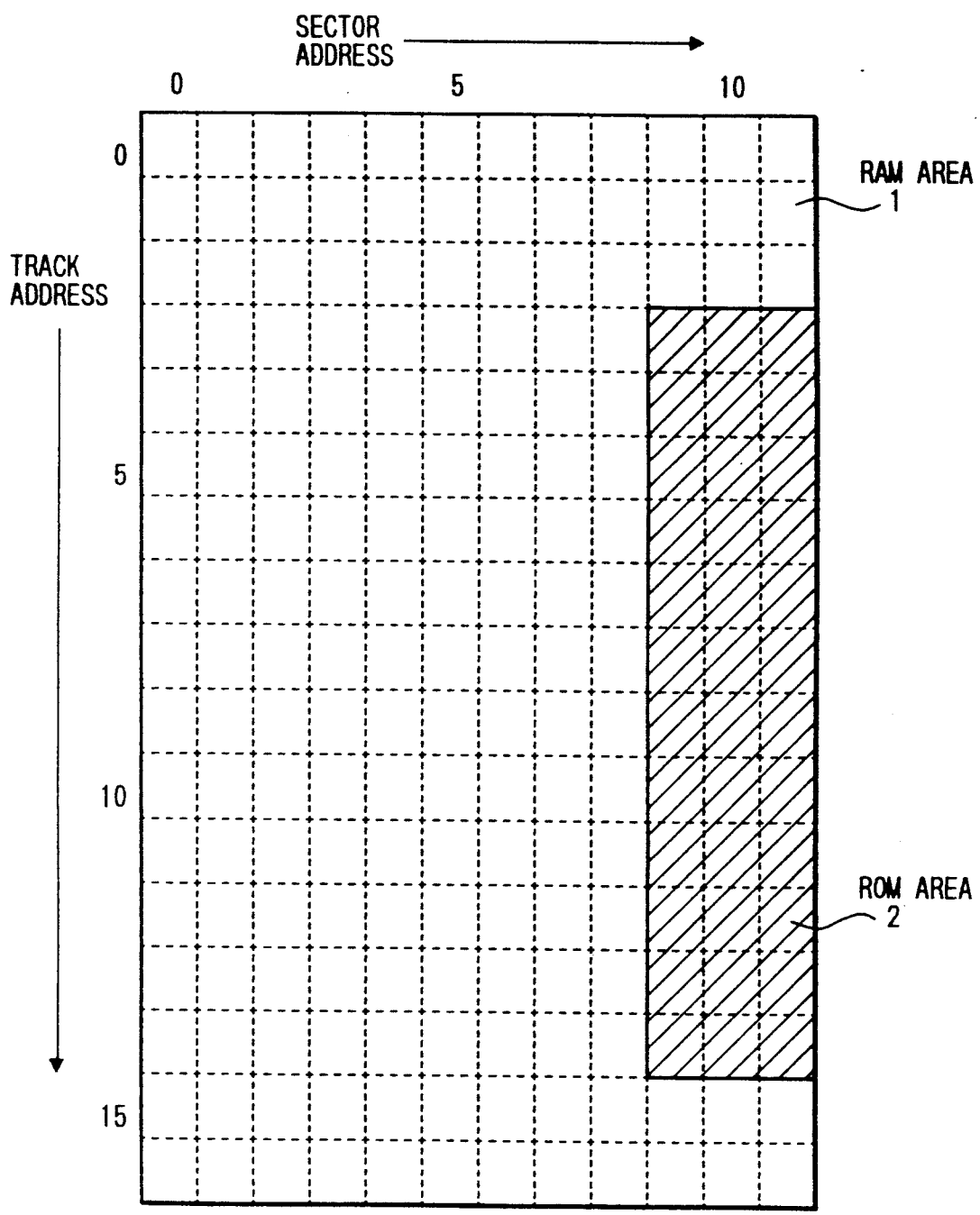
FIG. 17 is a diagram for illustrating the construction of the seventh embodiment of FIG. 16 by representing each sector by using a square cell.

For instance, when old information stored in a sector, of which the track address and the sector address are 5 and 9, respectively, of FIG. 17 should be updated, the latest update information is written to another sector, of which the track address and the sector address are 5 and 8, respectively. Thereby, in case of the eighth embodiment, update information can be written to the same track, to which information to be updated written, differently from the seventh embodiment in which update information is written to a sector of a track which is different from a track to which information to be updated is written. Thus a seek time becomes unnecessary. Further, the eighth embodiment can transfer data faster than the seventh embodiment. Incidentally, a smaller central angle formed by two radii joining the outer and inner arcs of the ROM area 2 of FIG. 16 is equal to $\pi/2$. However, the smaller central angle may be changed into, for example, ($\frac{2}{3}$) $\pi$ or $\pi$. This is the same with other embodiments which will be described hereinbelow.

Figure 18:
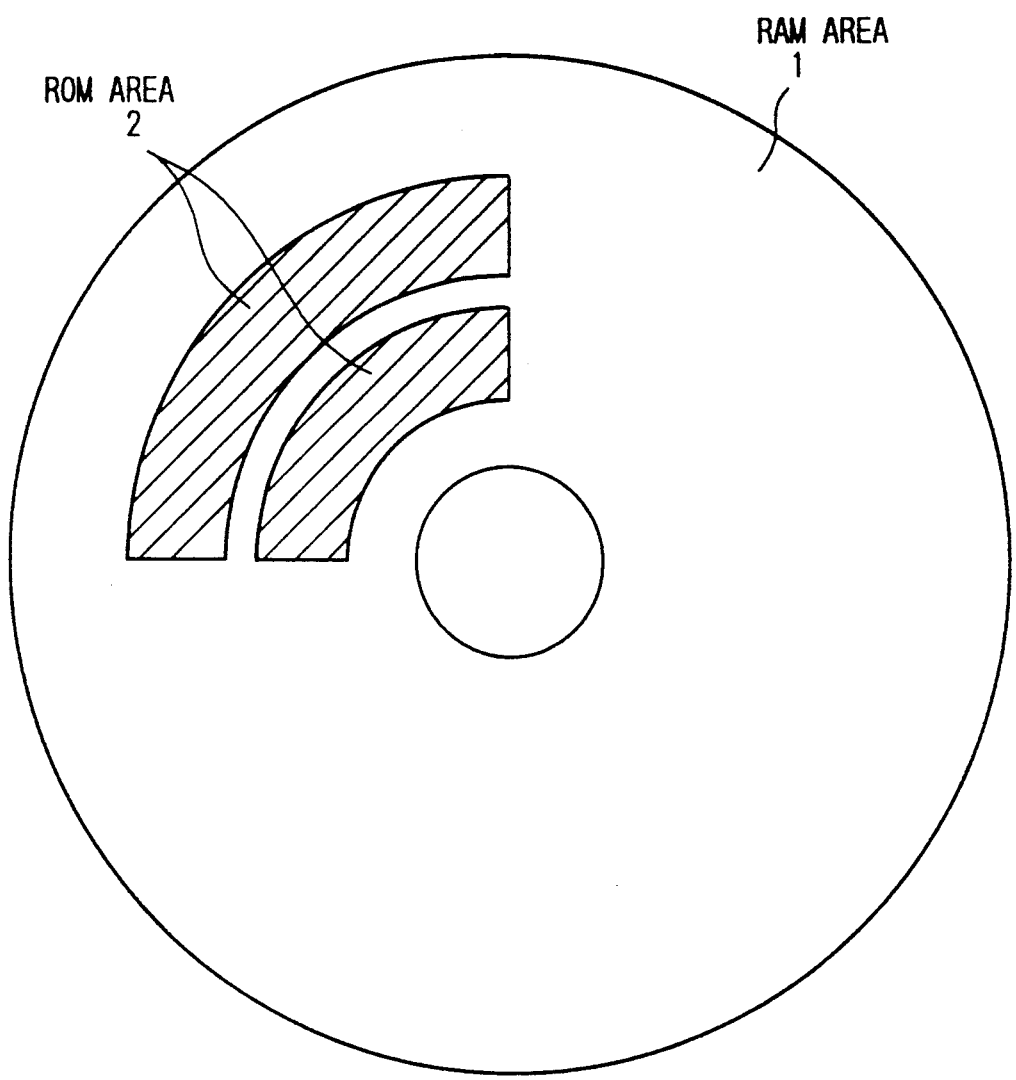
FIGS. 18 and 19 are diagrams each for illustrating the construction of a ninth embodiment of the present invention.
Figure 19:
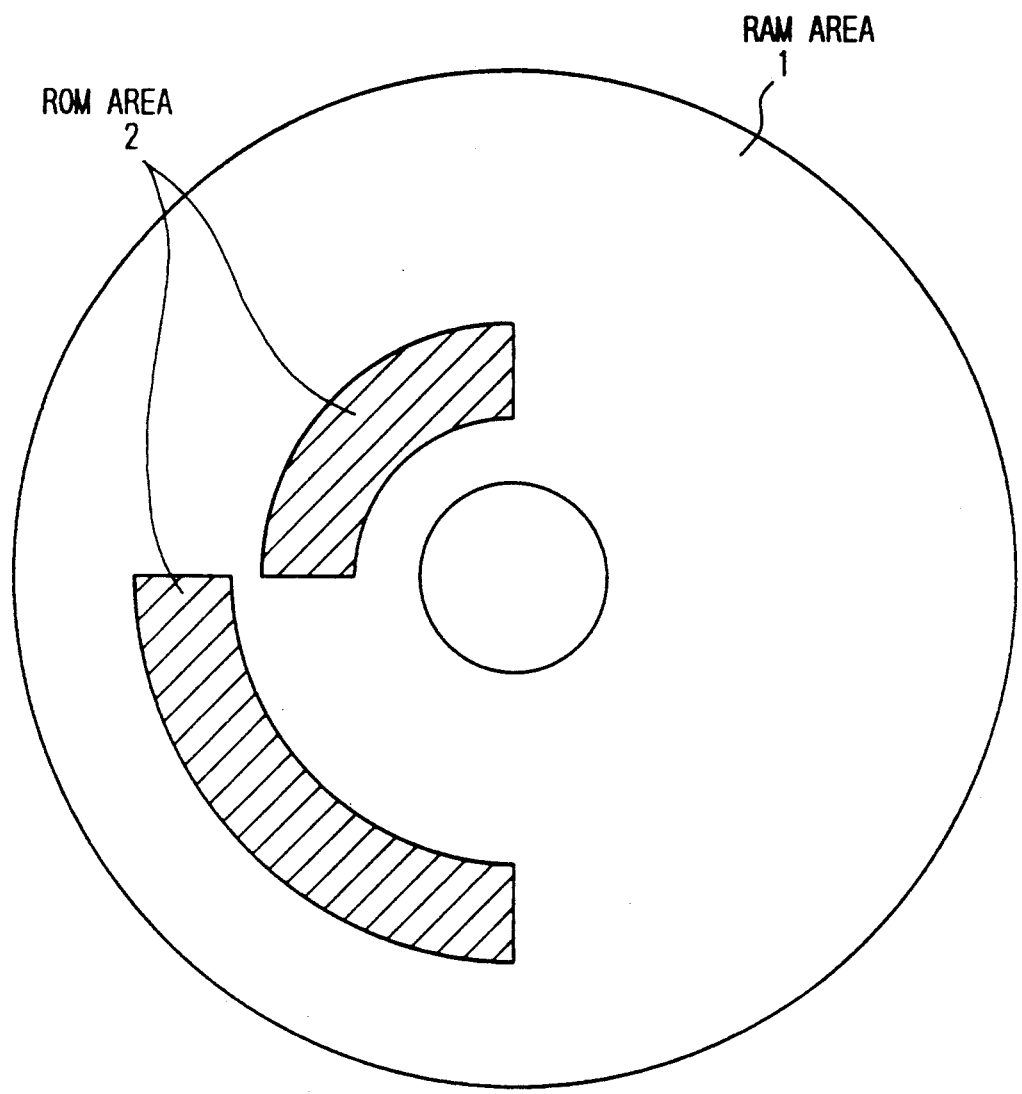
Figure 20:
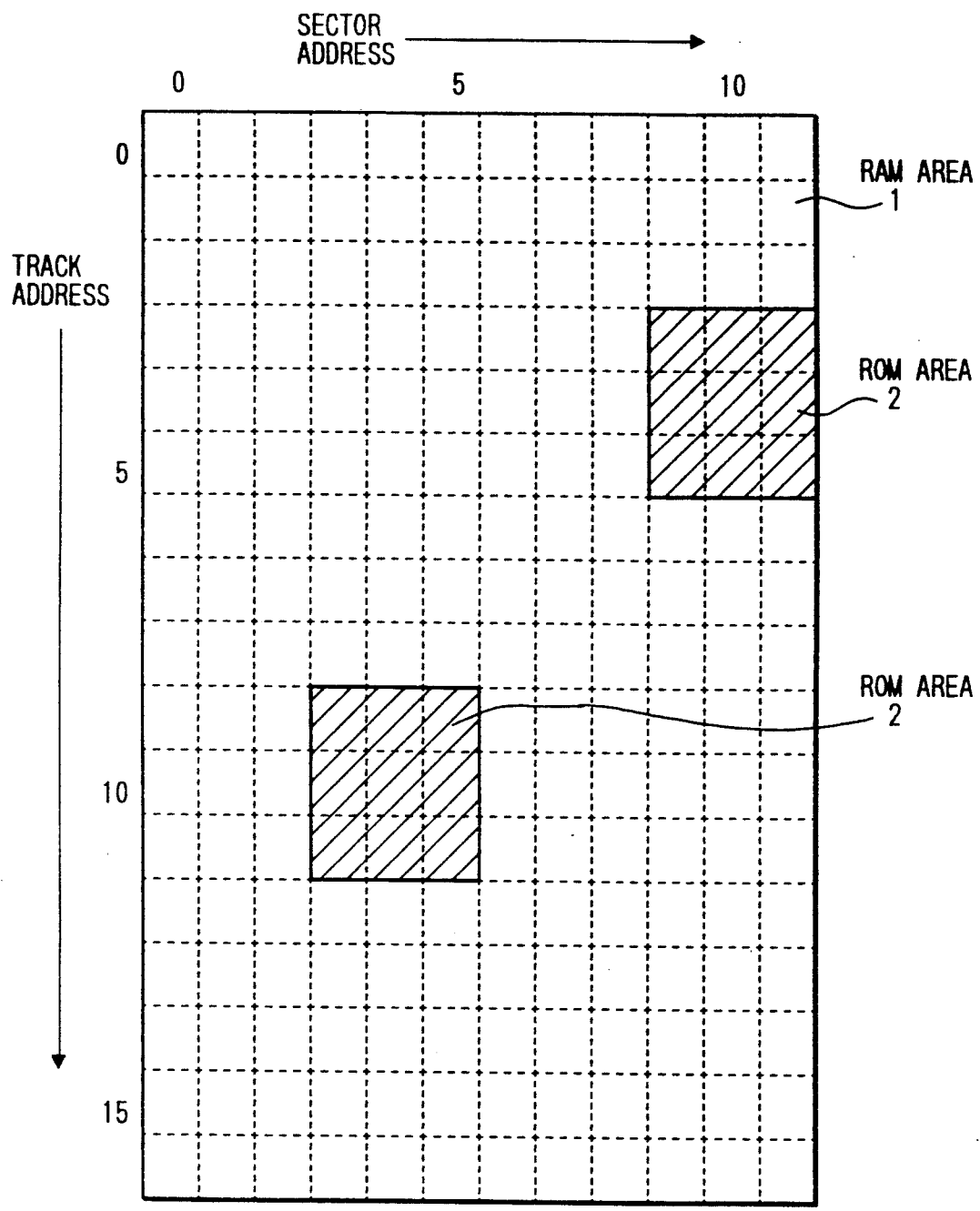
FIG. 20 is a diagram for illustrating the construction of the ninth embodiment of FIG. 19 by representing each sector by using a square cell.

Next, a ninth embodiment of the present invention will be described hereinafter by referring to FIGS. 18 to 20. As illustrated in FIG. 18, in the ninth embodiment, a RAM area 1 is arranged in such a manner to be disposed between two partial-sector-like ROM areas 2, each of which is similar to the ROM area of the eighth embodiment. Each of the two partial-sector-like ROM areas 2 of the ninth embodiment has two sides at 9 o'clock to 12 o'clock. In case of another arrangement of FIG. 19, an outer one of the partial-sector-like ROM areas 2 of the ninth embodiment has two sides at 6 o'clock to 9 o'clock and an inner one of the partial-sector-like ROM areas 2 has two side at 9 o'clock to 12 o'clock. FIG. 20 illustrates the arrangement of sectors of tracks of the ninth embodiment of FIG. 19 by representing each sector by using a square cell.

In case of the eighth embodiment, update information is stored in the same track which includes a corresponding ROM area 2 (namely, a read-only storage area storing information to be updated). Further, in case that a part of the update information cannot be stored in the same track, the part of the update information is stored in a track of the RAM area 1 in the vicinity of the outer or inner arc of the partial-sector-like ROM area 2. In order to facilitate this storing processing, the ROM area 2 is divided into two smaller ROM areas 2 and a RAM area 1 is provided between the smaller ROM areas 2. By employing the arrangement of the ROM areas 2 of FIG. 19, a latency time (or a rotational delay time) in case of moving a reading head from an inner one of the ROM areas 2 to an outer one thereof can be decreased.

Figure 21:
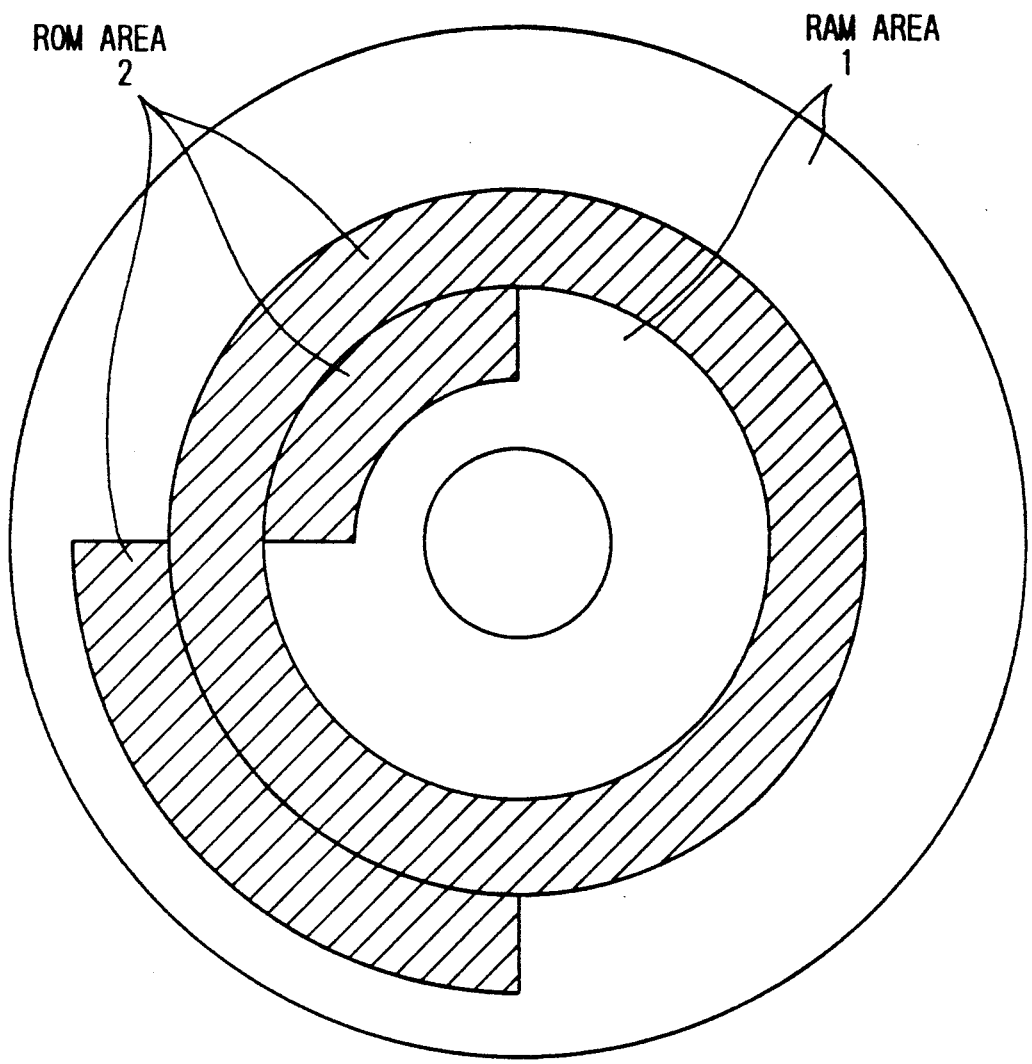
FIG. 21 is a diagram for illustrating a tenth embodiment of the present invention.
Figure 22:
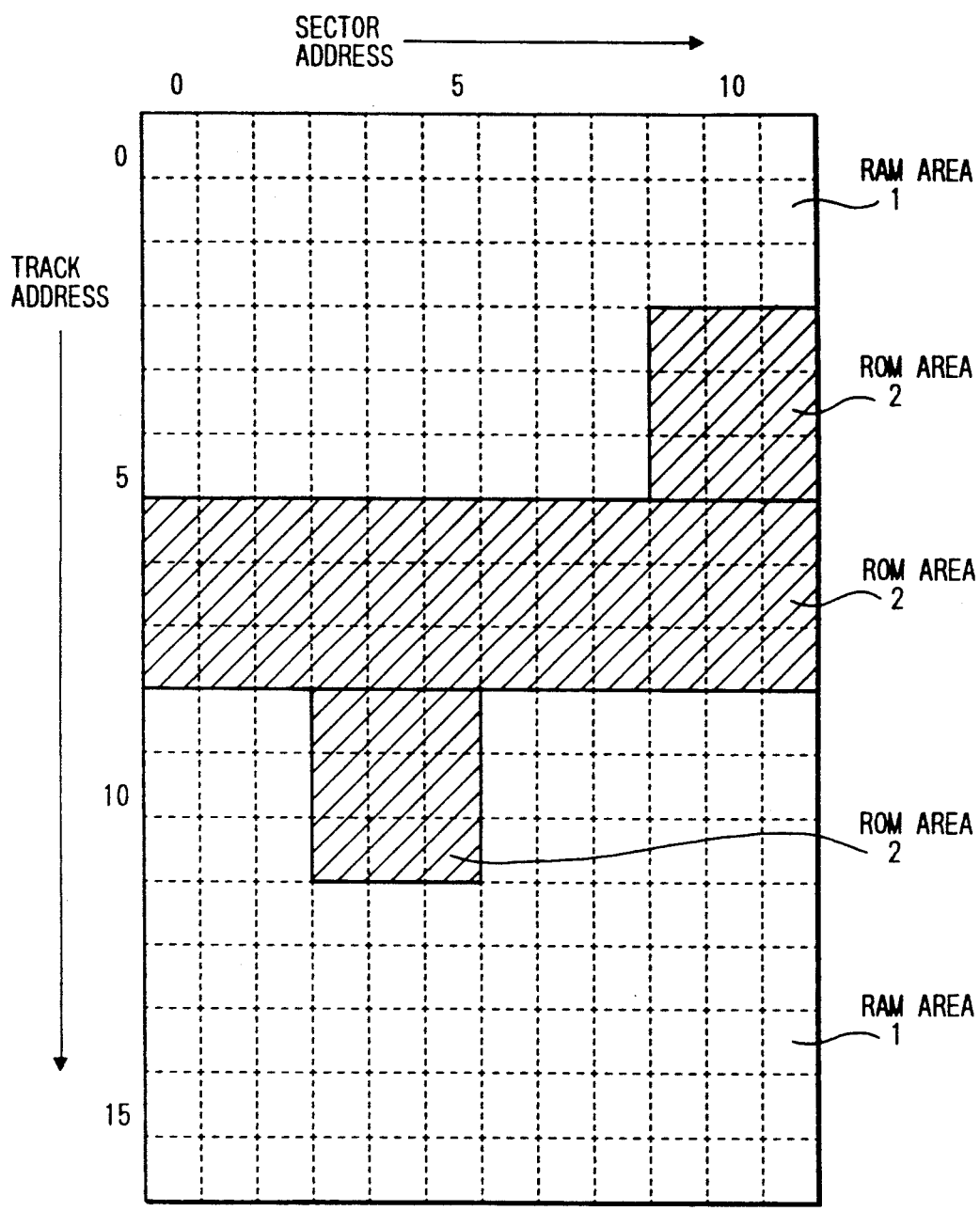
FIG. 22 is a diagram for illustrating the construction of the tenth embodiment of FIG. 21 by representing each sector by using a square cell.

Next, a tenth embodiment of the present invention will be described hereinbelow by referring to FIGS. 21 and 22.

The tenth embodiment, in which a ring-like ROM area 2 is provided in such a way to touch partial-sector-like ROM areas 2, is a combination of the seventh and ninth embodiments.

Hereinafter, a practical example of utilization of the tenth embodiment will be described. First, fundamental information or data (namely, information or data which is hardly updated) is stored in the ring-like ROM area 2. The host computer saves such fundamental information at the beginning of a system operation, and thereafter detailed information other than the fundamental information is stored in the partial-sector-like ROM areas 2. When a user retrieves the fundamental information, the ROM area 2 is accessed. When updating the detailed information, update information can be written to a sector of the RAM area 1 of the same track or an adjacent track, which is near to the ROM area 2. For example, in case of storing practical information such as map information, information regarding topographies, trunk roads and railroads or the like in Japan may be employed as the fundamental information. Further, information on locations and names of supermarkets retail stores or the like may be employed as the detailed information.

Figure 23:
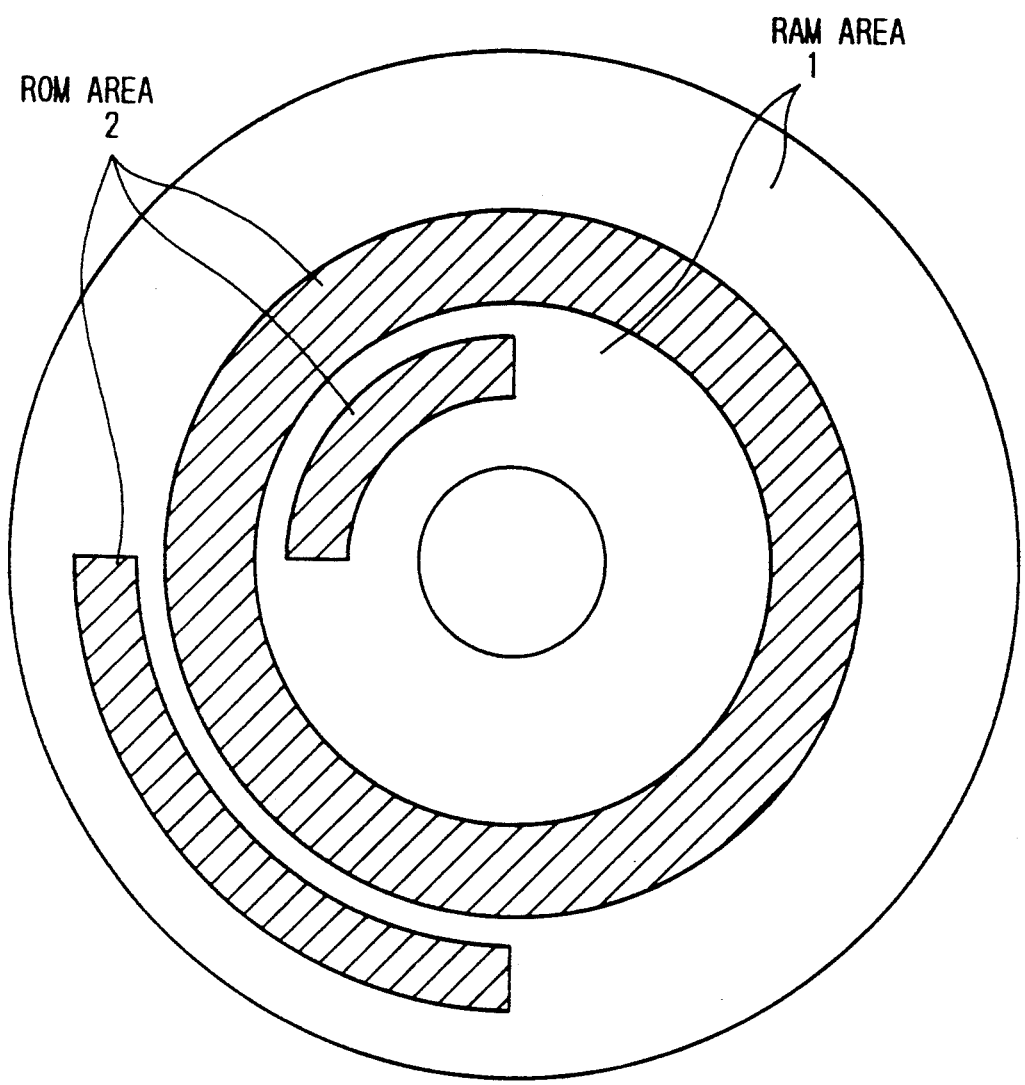
FIG. 23 is a diagram for illustrating an eleventh embodiment of the present invention.
Figure 24:
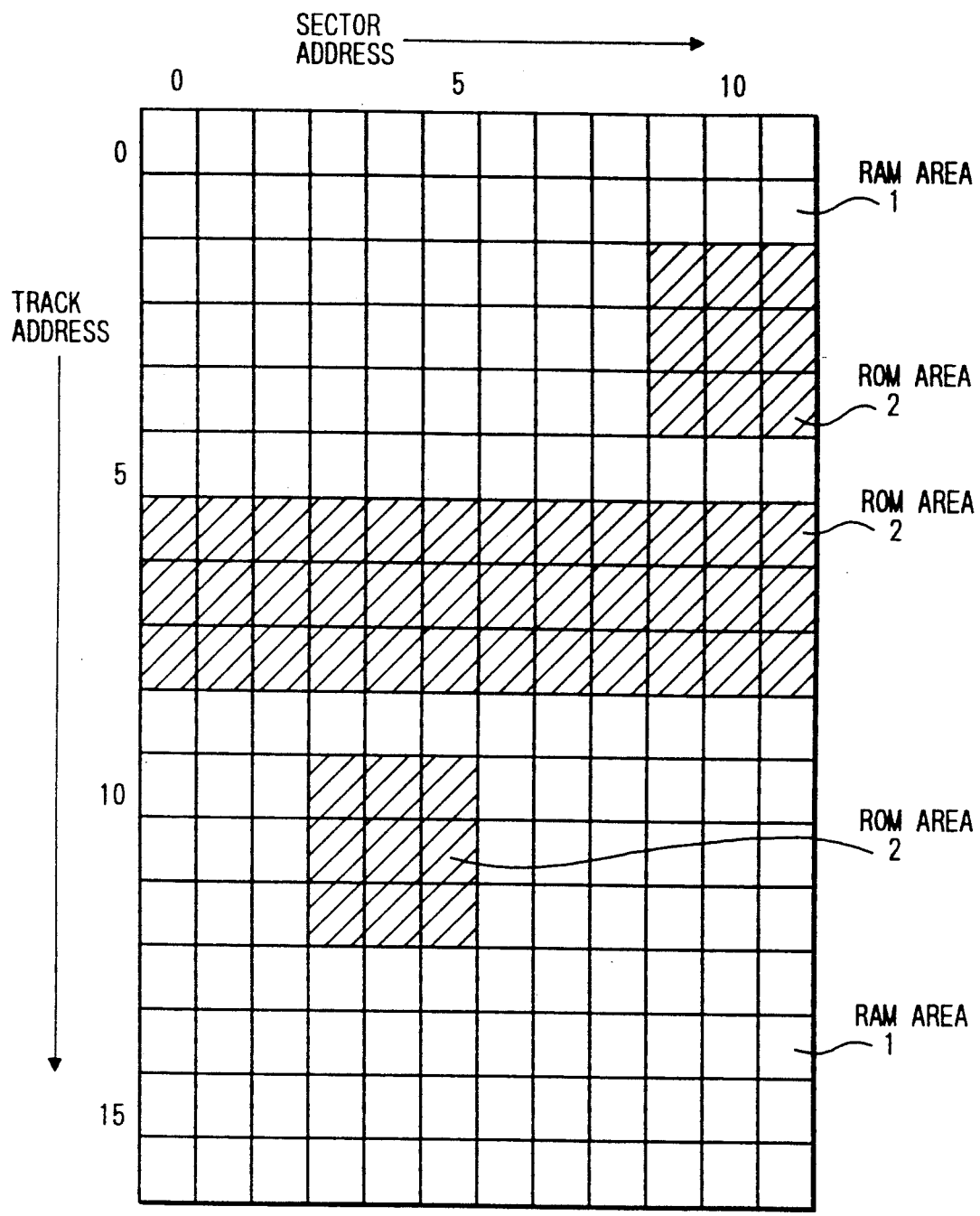
FIG. 24 is a diagram for illustrating the construction of the eleventh embodiment of FIG. 23 by representing each sector by using a square cell.

Next, an eleventh embodiment of the present invention will be described hereinbelow by referring to FIGS. 23 and 24. The eleventh embodiment, in which a RAM area 1 is interposed between a ring-like ROM area 2 and a partial-sector-like ROM area 2 and an update information storing area is provided in the neighborhood of each ROM area 2, is a modification of the tenth embodiment. Thus a seek time required to access update information can be decreased.

While preferred embodiments of the present invention have been described above, it is to be understood that the present invention is not limited thereto and that other modifications will be apparent to those skilled in the art without departing from the spirit of the invention. For instance, the embodiments in case of applying the present invention to optical disks of what is called Constant Angular Velocity (CAV) type have been described above. It is, however, apparent that the present invention can be applied to an optical disk of what is called Constant Linear Velocity (CLV) type and to a combination of an optical disk of CAV type and another optical disk of CLV type. Further, any storage unit of the RAM and ROM areas other than a sector may be employed.

The scope of the present invention, therefore, is to be determined solely by the appended claims.

What is claimed is:

1. A storage medium comprising:
    a read/write storage region;
    a read-only storage region; and
    a preliminary storage region for storing data to be stored in sectors, which are defective in a storing function, of the read/write storage region and the read-only storage region, wherein if the read-only storage region includes a code region, logical addresses are not assigned to sectors of the code region.

2. The storage medium as set forth in claim 1, wherein the read-only storage region includes a code region, and logical addresses are not assigned to sectors of the code region.

3. A storage medium comprising:
    a read/write storage region;
    a first preliminary storage region for storing data to be stored in a defective sector, which is defective in a storing function, of the read/write storage region;
    a read-only storage region; and
    a second preliminary storage region provided in the vicinity of the read-only storage region for storing data to be stored in a defective sector, which is defective in a storing function, of the read-only storage region, wherein if the read-only storage region includes a code region, logical addresses are not assigned to sectors of the code region.

4. A storage medium having a disk-like storage region, comprising:
    a plurality of concentric-circular-ring-like read-only storage areas provided in the disk-like storage region; and
    concentric-circular-ring-like read/write storage regions each interposed between said concentric-circular-ring-like read-only storage areas, wherein update information to be used for updating information stored in each of said concentric-circular-ring-like read-only storage areas is written to an adjacent one of said concentric-circular-ring-like read/write storage regions.

5. A storage medium having a disk-like storage region, comprising:
    a concentric-partial-sector-like read-only storage area which is a part of a concentric ring-like storage area bounded by an inner and outer arcs and two radii of the disk-like storage region; and
    a read/write storage area provided in a part of said disk-like storage region other than said read-only storage area, wherein update information to be used for updating information stored in said read-only storage area is written to a part of said read/write storage area, which is the remaining part of the concentric ring-like storage area of the disk-like storage region.

6. The storage medium as set forth in claim 5, further comprising:
    another concentric-partial-sector-like read-only storage area which is a part of another concentric ring-like storage area bounded by an inner and outer arcs and two radii of the disk-like storage region; and
    another read/write storage area provided between said read-only storage areas.

7. The storage medium as set forth in claim 5, wherein the update information to be used for updating information stored in each of said read-only storage areas is written to another part of said disk-like storage region other than the remaining part of the concentric ring-like storage area.

8. The storage medium as set forth in claim 7, further comprising:
    another concentric-partial-sector-like read-only storage area which is a part of another concentric ring-like storage area bounded by an inner and outer arcs and two radii of the disk-like storage region; and
    another read/write storage area provided between said read-only storage areas.

9. A storage medium having a disk-like storage region, comprising:
- a plurality of concentric-partial-sector-like read-only storage areas, each of which is a part of a concentric ring-like storage area bounded by an inner and outer arcs and two radii of the disk-like storage region, said read-only storage areas being provided in said disk-like storage region in such a manner that said read-only storage areas do not coexist in the same concentric ring-like storage area of said disk-like storage region; and
- read/write storage areas provided in a part of said disk-like storage region other than said read-only storage areas and respectively corresponding to said read-only storage areas, each of said read/write storage areas coexisting with a corresponding one of said read-only storage areas in the same concentric ring-like storage area of said disk-like storage region, wherein update information to be used for updating information stored in each of said read-only storage areas is written to a corresponding one of said read/write storage areas.

10. The storage medium as set forth in claim 9, further comprising:
- another read/write storage area provided outside the concentric ring-like storage area, wherein the update information to be used for updating information stored in said concentric-partial-sector-like read-only storage area is written to said read/write storage area provided outside the concentric ring-like storage area.

11. A storage medium having a disk-like storage region, comprising:
- a concentric-ring-like read-only storage area provided in said disk-like storage region;
- a concentric-partial-sector-like read-only storage area, each of which is a part of a concentric ring-like storage area bounded by an inner and outer arcs and two radii of the disk-like storage region; and
- read/write storage areas provided in a part of said disk-like storage region other than said read-only storage areas, wherein update information to be used for updating information stored in said concentric-ring-like read-only storage area is written to one of said read/write storage areas, which is in a vicinity of said concentric-ring-like read-only storage area, and update information to be used for updating information stored in said concentric-partial-sector-like read-only storage area is 7ritten to one of said read/write storage areas, which is included in the concentric ring-like storage area.

12. A method for managing defective sectors in a storage medium in which a read/write storage region and a read-only storage region coexist, the method comprising the steps of:
  (i) if a defective sector is initially present in the read/write storage region, assigning logical addresses to sectors of the read/write storage region by slipping the defective sector and, if a defective sector is initially present in the read-only storage region, storing data, which should be stored in the defective sector of the read-only storage region, in a preliminary storage region; and
  (ii) if a defective sector occurs in the read/write storage region thereafter, storing data, which should be stored in the defective sector of the read/write storage region, in the preliminary storage region.

13. The method as set forth in claim 12 wherein when the data, which should be stored in the defective sector of the read-only storage region, is stored in the preliminary storage region, an alternate sector to store the data, which should be stored in the defective sector of the read-only storage region, is assigned to a sector of the preliminary storage region other than sectors of the preliminary storage region, the number of which is equal to that of defective sectors of the read/write storage region.

14. The method set forth in claim 12 wherein said steps of assigning logical addresses and storing data comprise the steps of separately performing sector slipping defect management (SDM) and linear replacement defect management (LDM) on each of said read/write and read-only storage regions.

* * * * *